(12) United States Patent
Nagura

(10) Patent No.: US 7,465,516 B2
(45) Date of Patent: Dec. 16, 2008

(54) BATTERY HOUSING STRUCTURE

(75) Inventor: Masato Nagura, Chino (JP)

(73) Assignee: Eastman Kodak Company, Rochester, NY (US)

( * ) Notice: Subject to any disclaimer, the term of this patent is extended or adjusted under 35 U.S.C. 154(b) by 753 days.

(21) Appl. No.: 11/053,126

(22) Filed: Feb. 8, 2005

(65) Prior Publication Data

US 2006/0097694 A1    May 11, 2006

(51) Int. Cl.
*H01M 2/10* (2006.01)
*G03B 17/00* (2006.01)

(52) U.S. Cl. .............................. 429/99; 396/539; 429/96

(58) Field of Classification Search ................ 429/163, 429/175, 176; 396/277; 220/811, 812, 813, 220/816, 824, 831, 810
See application file for complete search history.

(56) References Cited

U.S. PATENT DOCUMENTS 3,682,060 A * 8/1972 Furuta ......................... 396/539

5,631,098 A    5/1997 Suzuki

FOREIGN PATENT DOCUMENTS

| JP | SHO 63-186054 | 11/1988 |
| JP | 3230472 | 10/1991 |
| JP | HEI 8-76181 | 3/1996 |
| JP | HEI 8-77992 | 3/1996 |
| JP | HEI 8-87993 | 4/1996 |
| JP | 9163204 | 6/1997 |
| JP | HEI 10-3893 | 1/1998 |
| JP | HEI 10-199223 | 7/1998 |
| JP | 11-224654 | 8/1999 |
| JP | HEI 11-224654 | 8/1999 |

* cited by examiner

*Primary Examiner*—Susy Tsang-Foster
*Assistant Examiner*—Maria J Laios
(74) *Attorney, Agent, or Firm*—Pamela R. Crocker

(57) ABSTRACT

A lid of a battery case is supported on a shaft fixed on a battery box. The lid comprises a cover portion and a support arm for attaching the cover portion to the shaft. A hook formed on the cover portion engages with a hook receiver provided on the battery box, so as to retain the lid in a closed position. The hook is disengaged by sliding the lid from the closed position along the axial direction of the shaft, and the lid is subsequently rotated about the shaft to an open position. During rotation of the lid, a stopper abuts a side surface of the support arm to prevent sliding movement of the lid. When the lid is being rotated to be closed, the abutting stopper prevents jamming of the hook on top of the hook receiver.

6 Claims, 21 Drawing Sheets

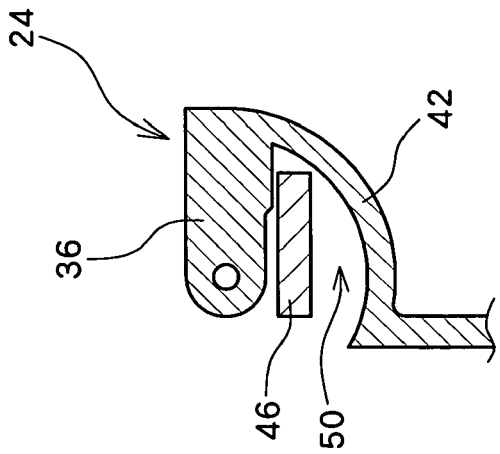
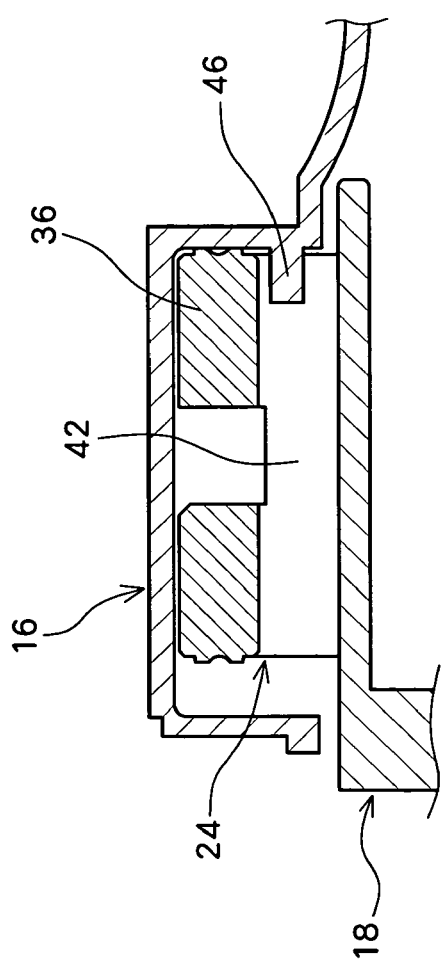
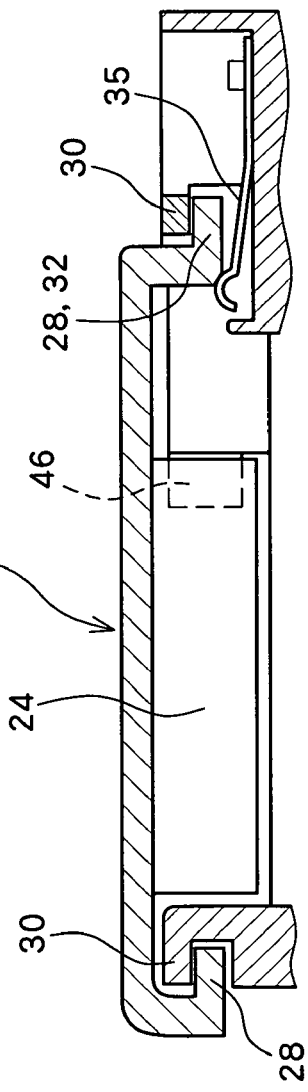
Fig. 6A
Fig. 6B
Fig. 6C

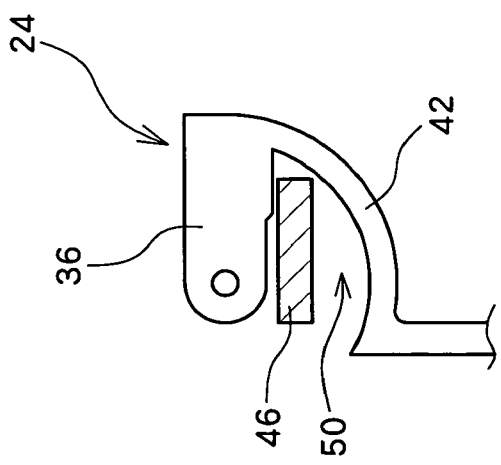
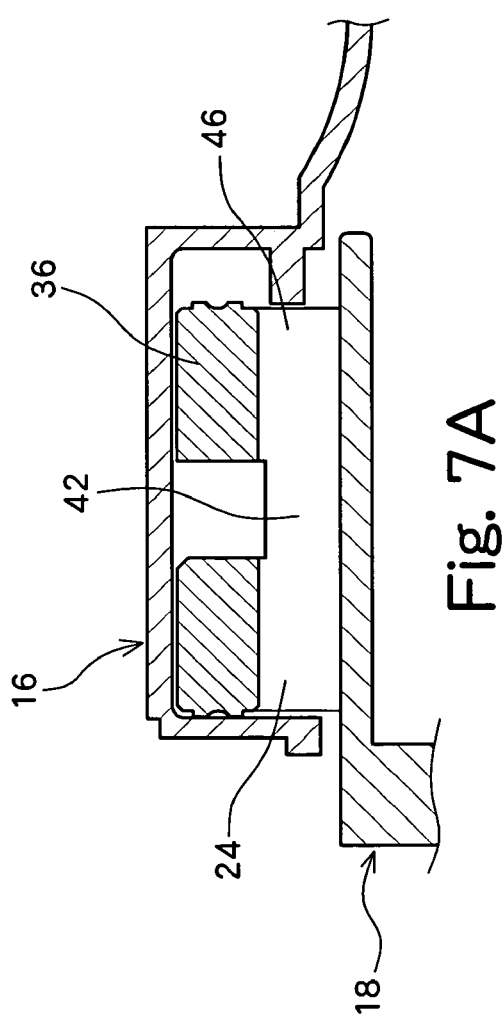
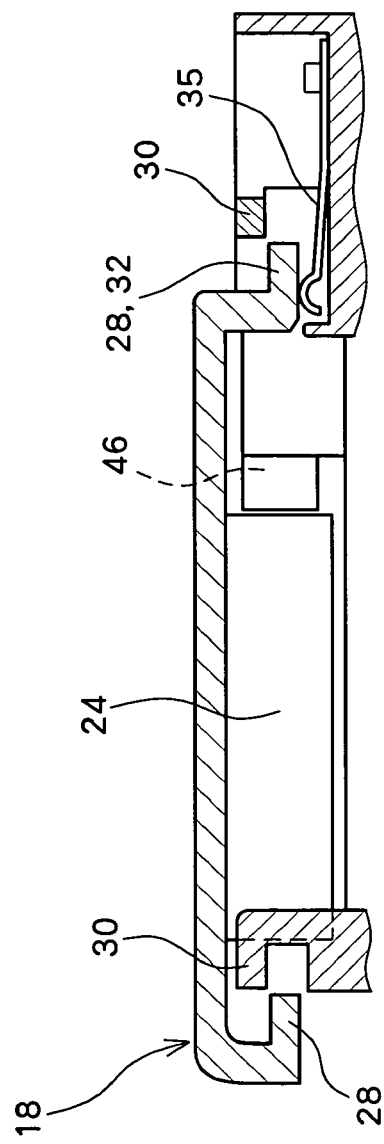

BATTERY HOUSING STRUCTURE

BACKGROUND OF THE INVENTION

1. Field of the Invention

The present invention relates to a battery housing structure in an electronic device, and more particularly to a battery housing lid (cover) which removably covers an opening through which a battery is inserted for placement into the housing and to structures surrounding the lid.

2. Description of the Related Art

In an electronic device which employs a primary battery cell such as a dry cell as the power source, a battery housing is provided with a lid which is removable for battery replacement. Japanese Patent Laid-Open Publication No. Hei 11-224654 describes a lid which is, when being opened or closed, displaced in a combination of sliding movement and rotating movement. Specifically, the document discloses a rotating member which is rotatably supported with respect to a battery chamber, and a battery housing lid which slides while being guided by the rotating member. When opening the lid, the lid is slid along a direction orthogonal to the direction along which the battery is inserted, so as to release engagement of a hook on the lid with the battery chamber. Subsequently, the lid and the rotating member are rotated as a single unit to displace the lid, allowing the battery to be removed. When closing the lid, reverse movements are performed. That is, the lid is first rotated and then slid so as to engage the hook. During the sliding motion, a contact provided on the inside of the lid scrapes against a terminal of the battery, such that an oxide film which forms on the terminal can be removed, thereby reducing contact resistance. By incorporating a rotating motion, the lid need not be detached from the main body of the device, thereby avoiding the possibility of lid misplacement.

According to the opening and closing structure of the battery housing lid described in the above-noted document, the sliding motion of the lid can be performed while the rotating member is at any position in the rotational path. Accordingly, the lid may be rotated to be closed while the lid is positioned in an inappropriate sliding position, which would cause the hook to bump into the portion which should actually receive the hook upon sliding, resulting in a failure to close the lid. If such closing action is forcibly performed, the hook and other parts may become broken.

SUMMARY OF THE INVENTION

The present invention provides a structure which enables opening and closing of a battery housing lid by a simple operation, and avoids excessive force from being applied to the hook when closing the lid.

A battery housing structure according to the present invention comprises a battery housing lid for removably covering an opening of a battery box which receives a battery. The lid includes a hook which, when the lid is in a closed position, engages with a hook receiver provided on the battery box. The lid is supported on a shaft provided on the battery box so as to be rotatable about the shaft, while also being slidable along the axis direction of the shaft. When the lid is being opened, the lid is first slid along the shaft axis direction from the closed position, so as to release engagement of the hook, thereby placing the lid in the hook release position. As a result of the release of the hook engagement, the lid is permitted to rotate. From the hook release position, the lid is rotated while using the shaft as the axis so as to be opened to the open position. The lid and the battery box include a slide prevention mechanism which permits the lid to slide into the closed position when the lid is in the hook release position, and prevents the lid from moving in the sliding direction when the lid is in a position between the hook release position and the open position. When the lid is being closed, the slide prevention mechanism prevents movement of the lid in the sliding direction during rotation of the lid from the open position to the hook release position, and terminates the slide prevention when the lid is placed in the hook release position to permit the lid to slide into the closed position.

The slide prevention mechanism preferably includes a support arm for attaching on the shaft, extending from the shaft, the lid of which covers the opening of the battery box, and a stopper provided on the battery box which abuts a side surface of the support arm. When the stopper abuts the side surface of the support arm, the support arm together with the lid is prevented from sliding toward the closed position. When the lid is in the hook release position, the stopper is released from abutment on the side surface to thereby permit the sliding movement.

The slide prevention mechanism may be preferably configured such that the support arm is substantially J-shaped. According to this embodiment, when the lid is in the hook release position, the stopper is positioned in the inside section of the J shape of the support arm, so as to be released from abutment on the support arm.

The battery housing structure may further include a first spring for urging the lid from the hook release position toward the open position, and a second spring for urging the lid from the closed position toward the hook release position, so as to achieve opening of the lid using force of the springs. With this arrangement, when the lid is released from being retained in the closed position, the second spring causes the lid to slide into the hook release position, and the first spring subsequently causes the lid to rotate to the open position. Alternatively, it is also possible to use a single spring, in place of the first and second springs, which serves to provide force in both the rotating and sliding directions.

A battery housing structure according to another aspect of the present invention comprises a battery housing lid for removably covering an opening of a battery box which receives a battery. The lid includes a lid base which is rotatably supported on the battery box, and a lid body which is slidably supported on the lid base. The lid body is configured to cover the opening, and includes a hook which, when the lid is in a closed position, engages with a hook receiver provided on the battery box. When the lid body is slid from a closed position, engagement of the hook with the hook receiver is released, thereby placing the lid in a hook release position in which rotation of the lid is permitted. From the hook release position, the lid base is rotated to an open position in which the opening is uncovered. The lid and the battery box include a slide prevention mechanism, which permits the lid body to slide into the closed position when the lid is in the hook release position, and prevents the lid body from moving in the sliding direction when the lid is in a position between the hook release position and the open position.

As the slide prevention mechanism of the above-described battery housing structure according to another aspect of the present invention, the lid may comprise a stopper disposed on the lid base. When the lid is in a position between the hook release position and the open position, the stopper abuts the lid body in the sliding direction so as to prevent sliding of the lid body toward the closed position. In addition, the battery box may comprise a release protrusion which, when the lid is placed into the hook release position from the open position, serves to deflect the stopper by contacting the stopper laterally with respect to the abutting direction of the stopper on the lid body, thereby releasing engagement of the stopper with the lid body.

According to another example of the slide prevention mechanism, the lid may comprise a stopper disposed on the lid body. When the lid is in a position between the hook release position and the open position, the stopper engages with the lid base so as to prevent sliding of the lid body toward the closed position. In addition, the battery box may comprise a release protrusion which, when the lid is placed into the hook release position from the open position, serves to deflect the stopper by contacting the stopper laterally with respect to the abutting direction of the stopper on the lid base, thereby releasing the lid body.

BRIEF DESCRIPTION OF THE DRAWINGS

FIGS. 6A-6C are diagrams for explaining the opening and closing movement of the lid 18, and specifically illustrate the lid in the closed position.

FIGS. 7A-7C are diagrams for explaining the opening and closing movement of the lid 18, and specifically illustrate the lid in the hook release position.

DESCRIPTION OF THE PREFERRED EMBODIMENTS

Figure 1:
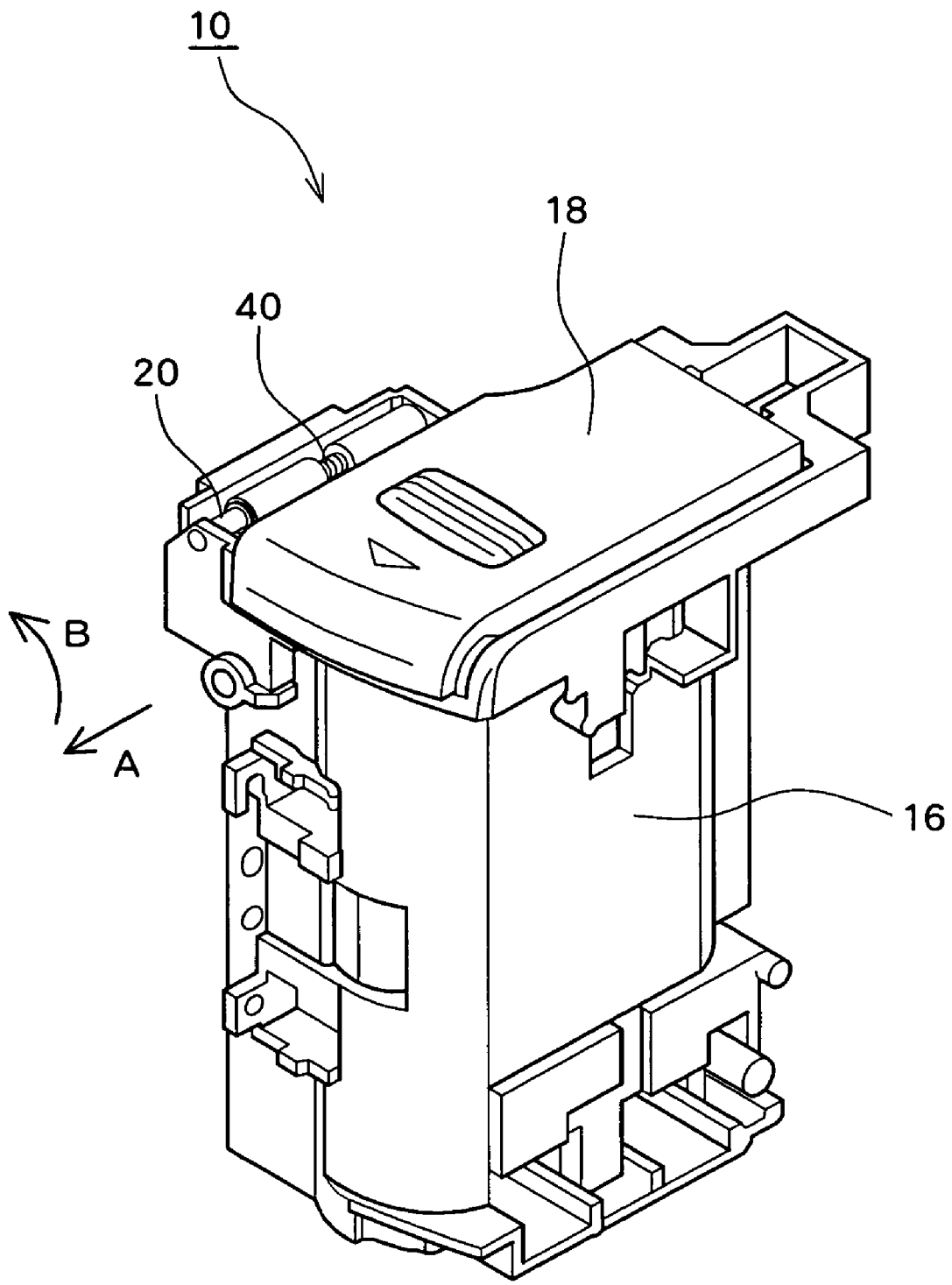
FIG. 1 is an external perspective view of a battery case 10 according to an embodiment of the present invention.

Preferred embodiments of the present invention are described below referring to the drawings.

FIG. 1 is an external perspective view of a battery case 10 for housing a battery in a portable electronic device such as a digital camera. Formed on the inside of the battery case 10 is a housing chamber 12 (refer to FIG. 2) for housing the battery. The battery case 10 further includes an opening 14 (refer to FIG. 2) which connects the housing chamber 12 to outside so as to enable replacement of the battery placed inside, and a battery case lid 18 for removably covering the opening 14. The lid 18 opens and closes by generally sliding in the direction denoted by arrow A and rotating in the direction denoted by arrow B. The lid 18 rotates until it is positioned along the vertical direction in FIG. 1. By this rotation, the opening 14 is uncovered, allowing the battery placed inside to be removed in the upward direction. When installing a battery, the battery is inserted from the upward direction into the housing chamber 12. It should be noted that the sliding direction (denoted by arrow A) is a direction orthogonal to the direction of removal and insertion of the battery. A shaft 20 is disposed adjacent the opening 14 along the direction orthogonal to the direction of removal and insertion of the battery. The lid 18 is slidably and rotatably supported on this shaft 20. More specifically, the lid 18 slides along the direction of arrow A while being guided by the shaft 20, and rotates in the direction of arrow B using the shaft 20 as the axis.

Figure 2:
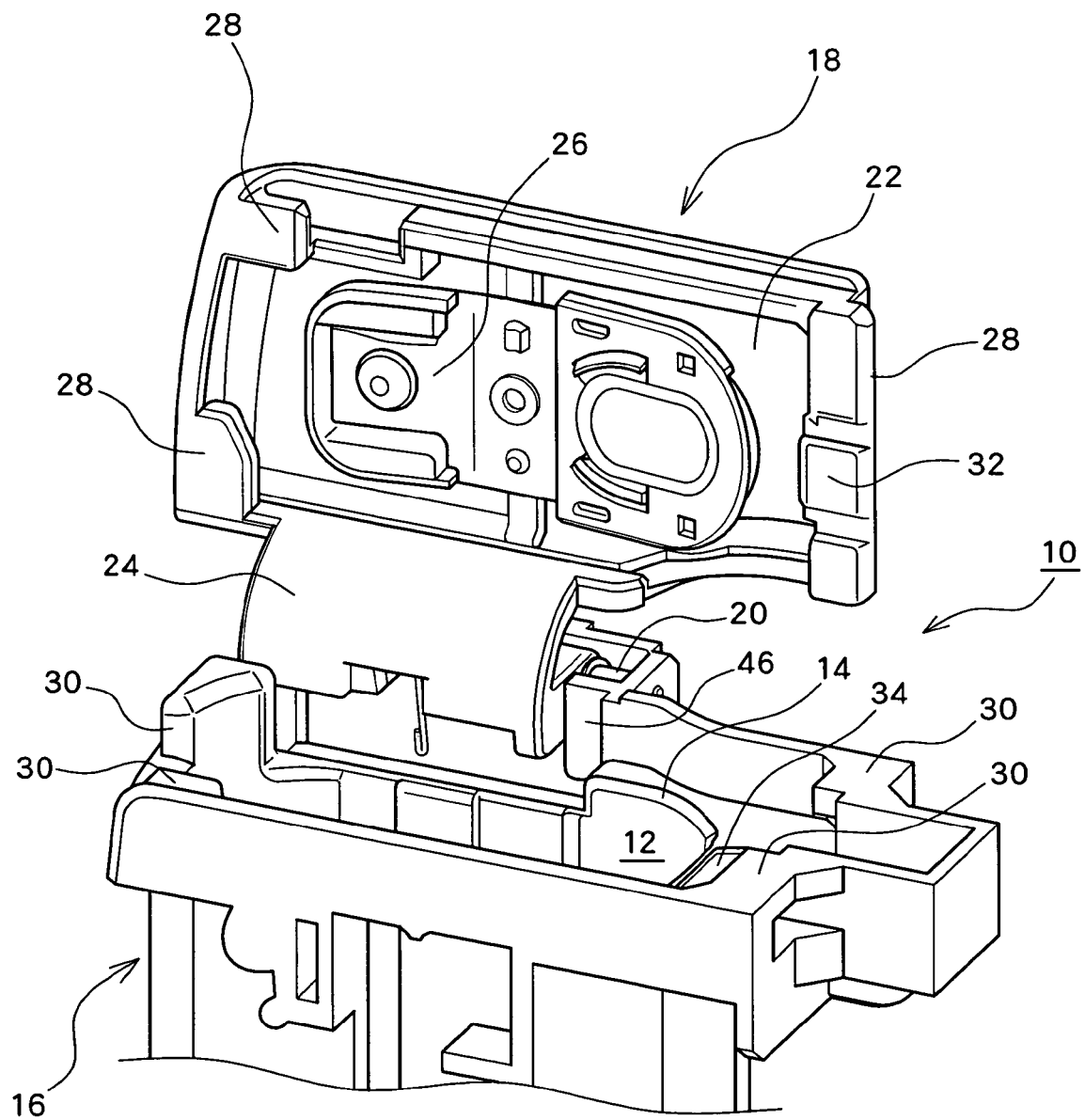
FIG. 2 shows the battery case 10 with its lid 18 in an open state.
Figure 3:
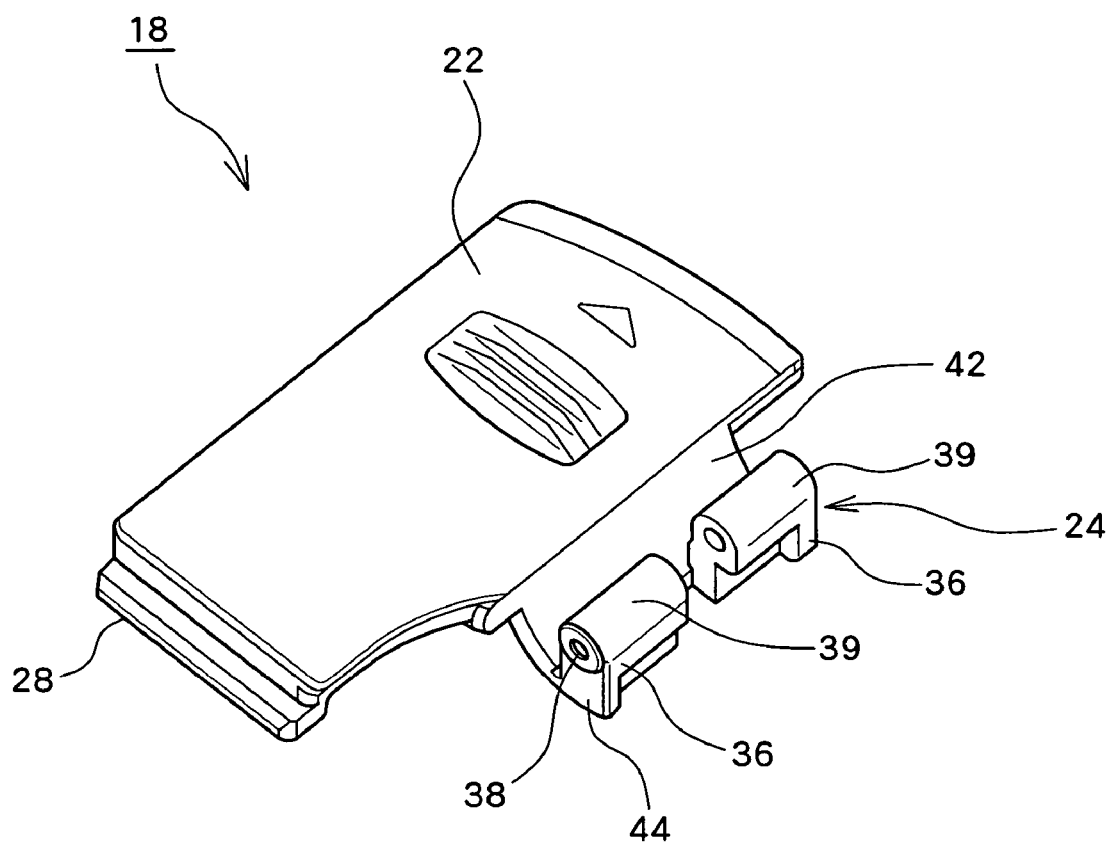
FIG. 3 is a perspective view showing the lid 18.

FIG. 2 shows the details around the opening 14 of the battery case 10 with the battery case lid 18 in an open state, while FIG. 3 shows the lid 18 by itself. The lid 18 comprises a cover portion 22 for covering the opening 14, and a support arm 24 for attaching the cover portion 22 on the shaft 20 in a manner extending from the shaft 20. Further, a contact piece 26 for contacting with a terminal of the battery is disposed on the inside surface of the cover portion 22. On both ends of the lid along the sliding direction A, hooks 28 are formed protruding in the closing direction. When the lid 18 is closed, these hooks 28 fit under hook receivers 30 provided in corresponding positions on the battery box 16, to thereby prevent rotation of the lid 18 in the opening direction (denoted by arrow B). Furthermore, a retaining protrusion 32 is formed on the lower surface of the hook 28 on the right side in FIG. 2. When the lid 18 is closed, the retaining protrusion 32 engages, in a latching manner, with a retaining spring 35 (refer to FIGS.

6C and 7C which is attached inside a recess 34 formed on the battery box 16 in a position opposing the protrusion 32. The lid 18 is thereby retained in a closed state.

The cross-section of the support arm 24 in the direction orthogonal to the shaft has a shape similar to the letter J, including a straight portion and a curved portion. The straight portion of the support arm 24 is referred to as the proximal arm portion 36 (positioned on the box side). Disposed on the upper end of the proximal arm portion 36 (that is, on the top portion of "J") are shaft sleeves 39 including through-holes 38 through which the shaft 20 extends. The proximal arm portion 36 is divided into two segments along the axis of the shaft 20, and a coil spring 40 (refer to FIG. 1) is provided between the two segments. The coil spring 40 is the spring which urges the lid 18 to rotate toward the opening direction, and is hereinafter referred to as the rotation spring 40. The curved portion of the support arm 24 is referred to as the distal arm portion 42 (positioned on the lid side). The distal arm portion 42 serves to connect between the lower end of the proximal arm portion 36 (which is opposite the end having the shaft sleeves 39) and the cover portion 22. The shaft 20 is arranged within the plane occupied by the cover portion 22 of the lid 18, or in parallel to and immediately adjacent to this plane. The support arm 24, because of its J shape, protrudes out of the plane. The shaft 20 may be fixed to the shaft sleeves 39 and configured to slide with respect to the battery box. Moreover, the shaft 20 may be formed as an integral portion of the lid.

A stopper 46 is provided on the battery box 16 in a position opposing a side surface 44 of the support arm 24. As can be clearly seen in FIG. 2, when the lid 18 is opened, the stopper 46 abuts the side surface of the support arm 24 to thereby prevent the lid 18 from moving in the rightward sliding direction. As explained below in detail, when the lid 18 is rotated from the open position of FIG. 2 to a position covering the opening 14, the stopper 46 is separated from the support arm 24, such that the lid 18 is permitted to slide in the rightward direction.

Figure 4:
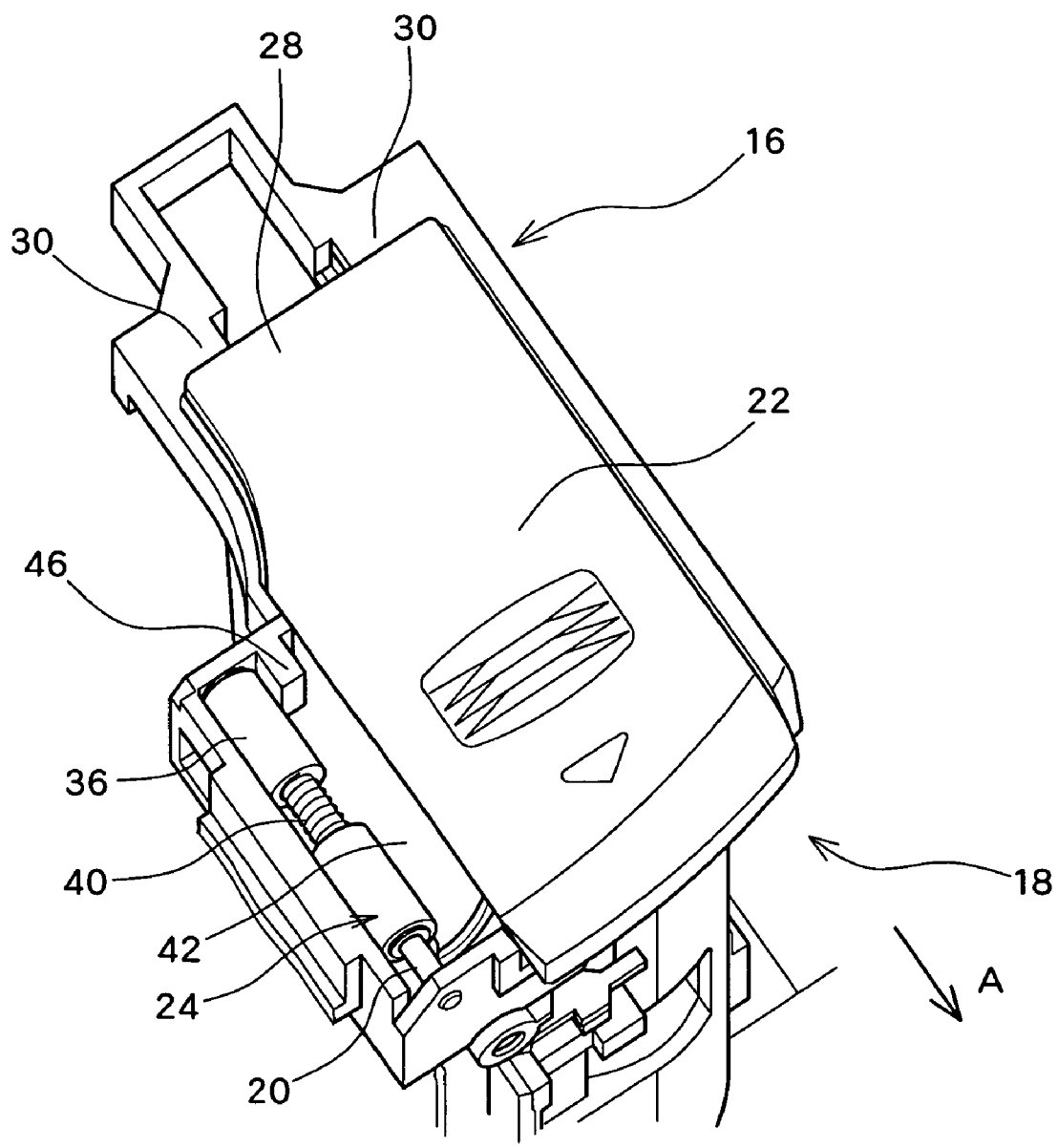
FIG. 4 shows the lid 18 in a closed state.
Figure 5:
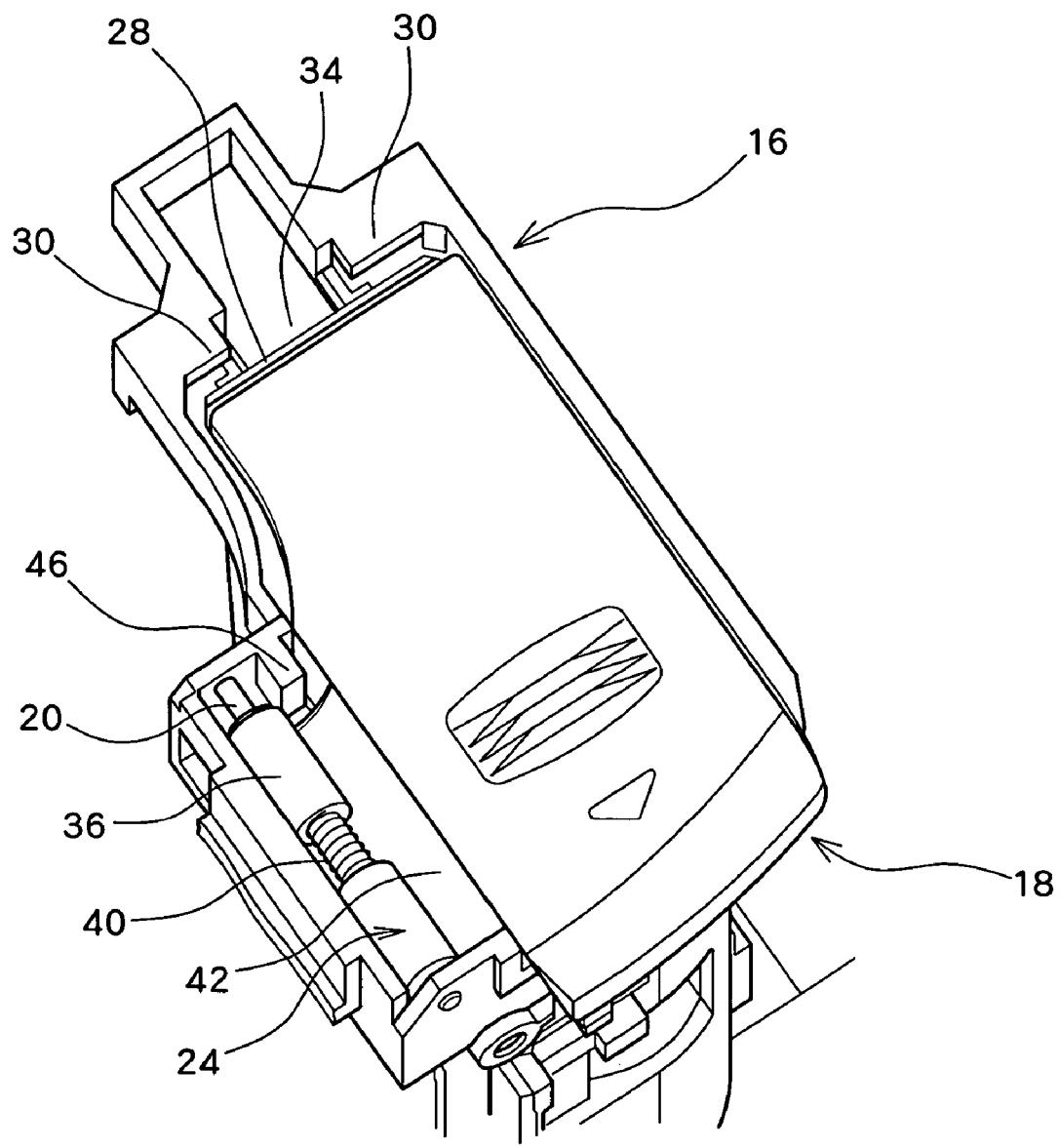
FIG. 5 shows the lid 18 after being slid into the hook release state.
Figure 8B:
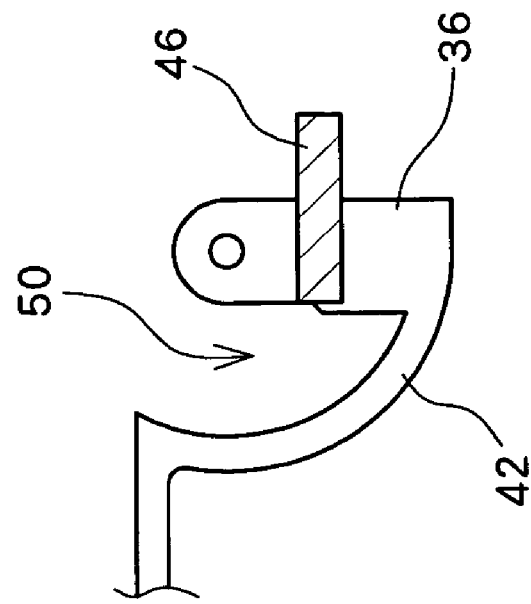
FIGS. 8A and 8B are diagrams for explaining the opening and closing movement of the lid 18, and specifically illustrate the lid in the open position.
Figure 8A:
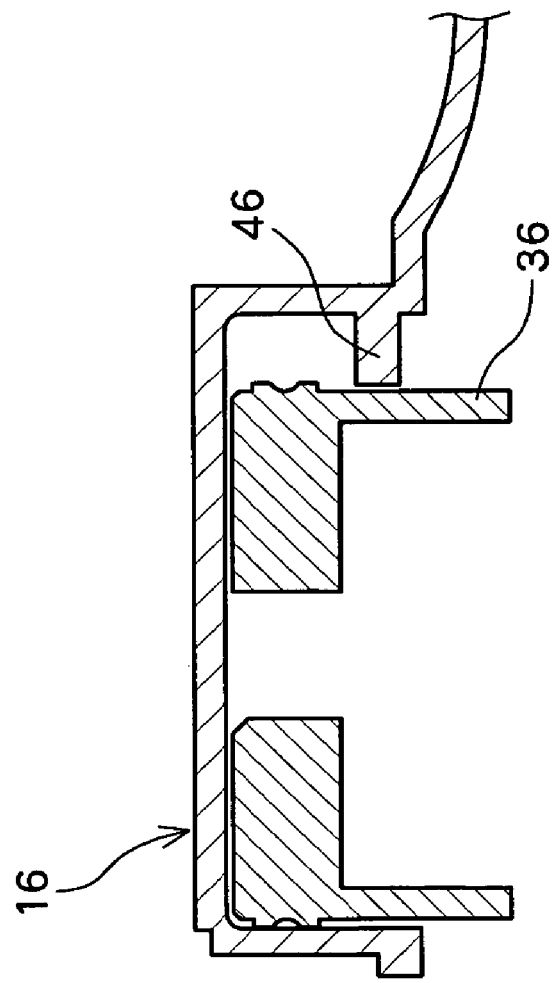

FIGS. 4 through 8B are diagrams for explaining the opening and closing movement of the battery case lid 18. FIG. 4 is a perspective view showing the lid 18 in the closed state (closed position), while FIGS. 6A-6C show cross-sectional views along three directions of the lid 18 in this state. FIG. 5 is a perspective view showing the lid 18 after sliding toward the direction of arrow A shown in FIG. 4 (same direction as arrow A of FIG. 1), while FIG. 7A-7C show cross-sectional views along three directions of the lid 18 in this state after sliding. The state shown in FIGS. 5 and 7A-7C is hereinafter referred to as the hook release position because engagement between the hooks 28 of the lid 18 and the hook receivers 30 of the battery box 16 is released in this state. FIGS. 8A and 8B illustrate cross-sectional views along two directions of the lid 18 in the open state shown in FIG. 2. Each of FIGS. 6A, 7A, and 8A diagrammatically shows a lid cross-section which is orthogonal to the direction of insertion and removal of the battery. Each of FIGS. 6B, 7B, and 8B diagrammatically shows a cross-section taken across the axis of the shaft 20. Each of FIGS. 6C and 7C diagrammatically shows the lid cross-section which is orthogonal to the cross-sectional views of FIGS. 6A, 6B and FIGS. 7A, 7B, respectively.

When the battery case lid 18 is in the closed position, the hooks 28 and the hook receivers 30 are engaged to prevent the rotational movement in the opening direction. Further, the retaining protrusion 32 is engaged with the retaining spring 35 to prevent the sliding movement. In order to open the lid 18, the lid is first slid toward the direction of arrow A in FIG. 4 using a force exceeding the retaining strength of the retaining spring 35. By sliding the lid 18 until the support arm 24 abuts an end surface of the battery box 16 in which the support arm 24 is placed, the hooks 28 are disengaged from the hook receivers 30. This position of the lid 18 is the hook release position. As a result of the sliding movement, the stopper 46 no longer overlaps the inside section 50 of the curved J portion of the support arm 24. At this point, because the hooks 28 are released from engagement with the hook receivers 30 and the stopper 46 from engagement with the support arm 24, the lid 18 is rotated by the urging force of the rotation spring 40 toward the direction of arrow B in FIG. 1, resulting in uncovering the opening 14 of the battery box.

To close the lid 18, the movements are performed in reverse. When the lid 18 is in the open position, the stopper 46 abuts the side surface of the support arm 24 to prevent the lid from sliding toward the closed position side. The stopper 46 continues to prevent the sliding of the lid 18 during rotation of the lid 18 back to the hook release position, thereby preventing jamming of the hooks 28 on top of the hook receivers 30 as a result of the rotation. When the lid 18 reaches the hook release position, the inside curved section 50 of the support arm 24 is arranged opposing the stopper 46, such that the stopper 46 no longer abuts the support arm 24 and the lid 18 is permitted to move toward the closed position. The lid 18 is finally slid into the closed position to engage the hooks 28.

As described above, the battery case lid 18 of the present embodiment is supported on the support arm 24 which attaches to the shaft 20 arranged in or immediately adjacent to the plane occupied by the cover portion 22. From the portion which is supported on the shaft 20, the support arm 24 first protrudes out of the above-noted plane, then curves back into the plane so as to connect with the cover portion 22. By employing a support arm 24 of this shape, the support arm 24 is configured to detour around and avoid abutting the stopper 46 when the lid 18 is in the closed position. It should be understood that the substantially J shape of the support arm 24 is not limited to an actual J shape, includes any shape which achieve this detouring feature, such as, for example, V or U shapes.

Figure 9:
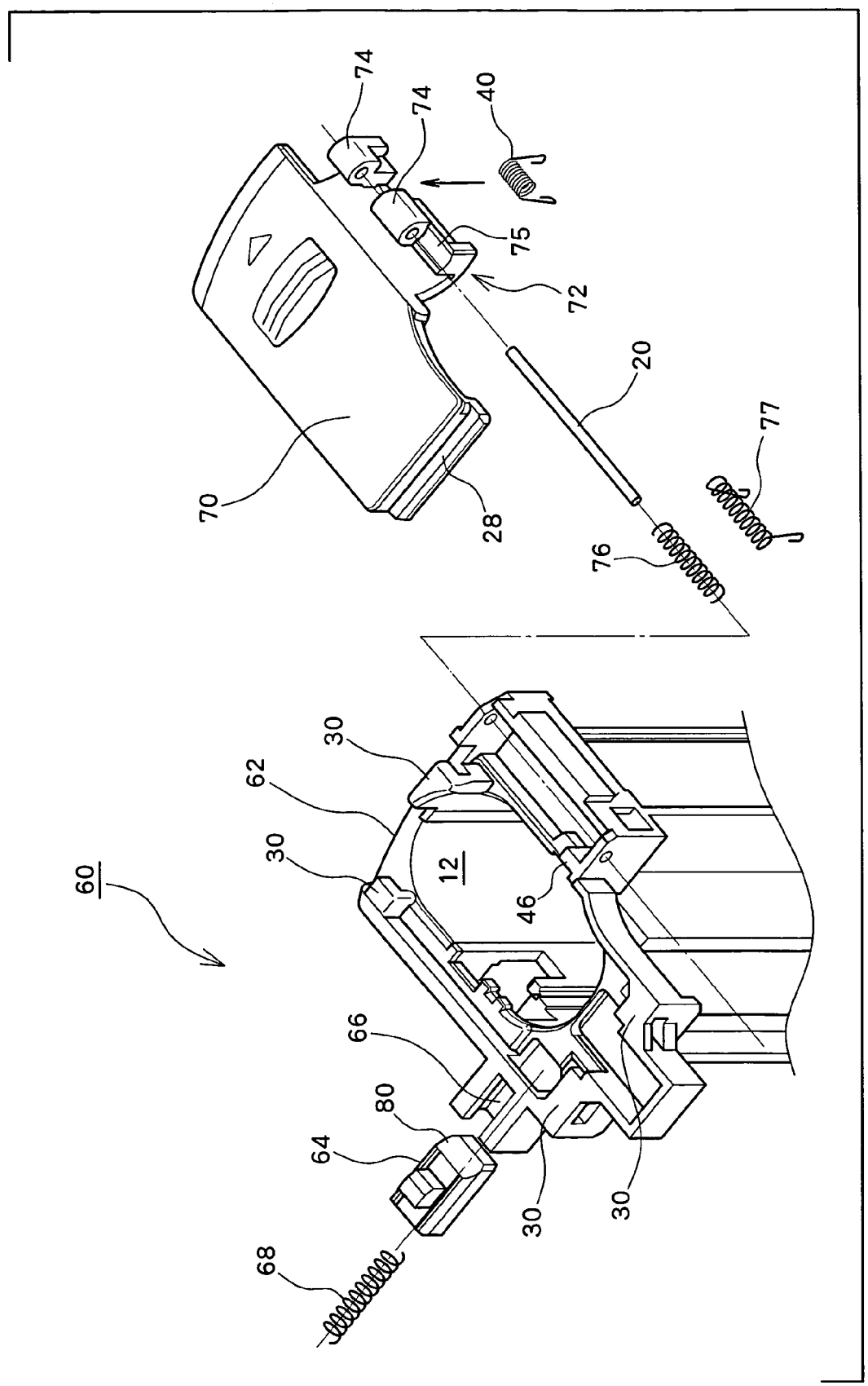
FIG. 9 is an external perspective view of a battery case 60 according to another embodiment of the present invention.

FIG. 9 is an exploded perspective view showing essential components of a battery case 60 according to another embodiment of the preset invention. As compared to the above-described battery case 10, the battery case 60 is configured to be opened by a simple one-step operation, and comprises additional structures for accomplishing this feature. Components of the battery case 60 which are identical to those of the battery case 10 are labeled with the same reference numerals, and explanation of those components will not be repeated.

Provided on the battery box 62 including the chamber 12 for housing the battery is a latch guide 66 for guiding the movement of a latch piece 64. The latch piece 64 is urged toward the battery case lid 70 by a latch spring 68. The support arm 72 of the lid 70 is formed such that the two shaft sleeves 74 having through-holes through which the shaft 20 extends are generally shifted toward the upper right direction in FIG. 9. Similarly as in the battery case 10, the rotation spring 40 is disposed between the two shaft sleeves 74. In addition, a spring receiving space 75 is provided between the shaft sleeve 74 on the left-hand side in FIG. 9 and the battery box 62. A slide spring 76 for urging the lid 70 toward the upper right direction in FIG. 9 is disposed in this spring receiving space 75.

Figure 10:
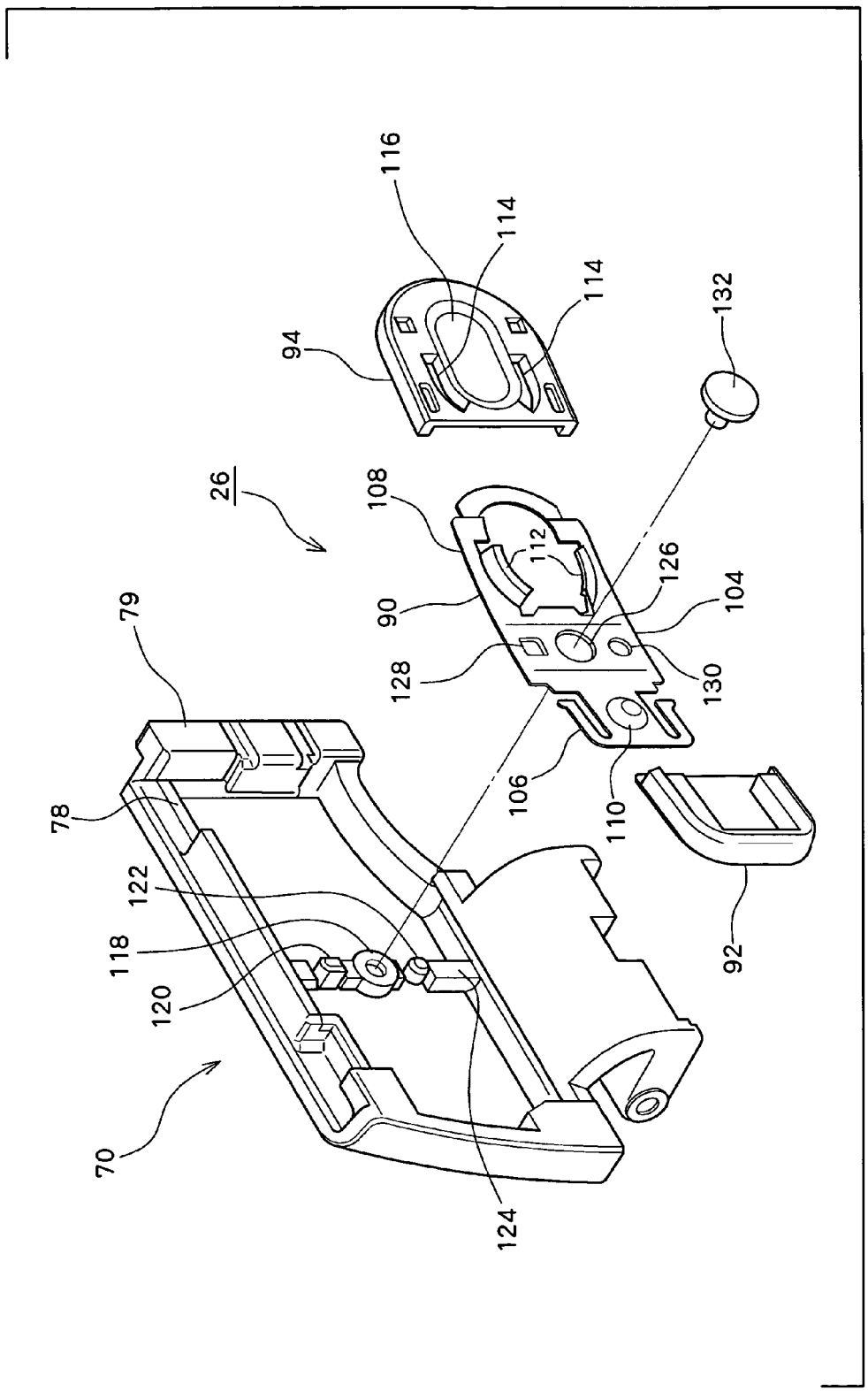
FIG. 10 is an exploded perspective view showing a battery case lid 70 and a contact piece 26.
Figure 11:
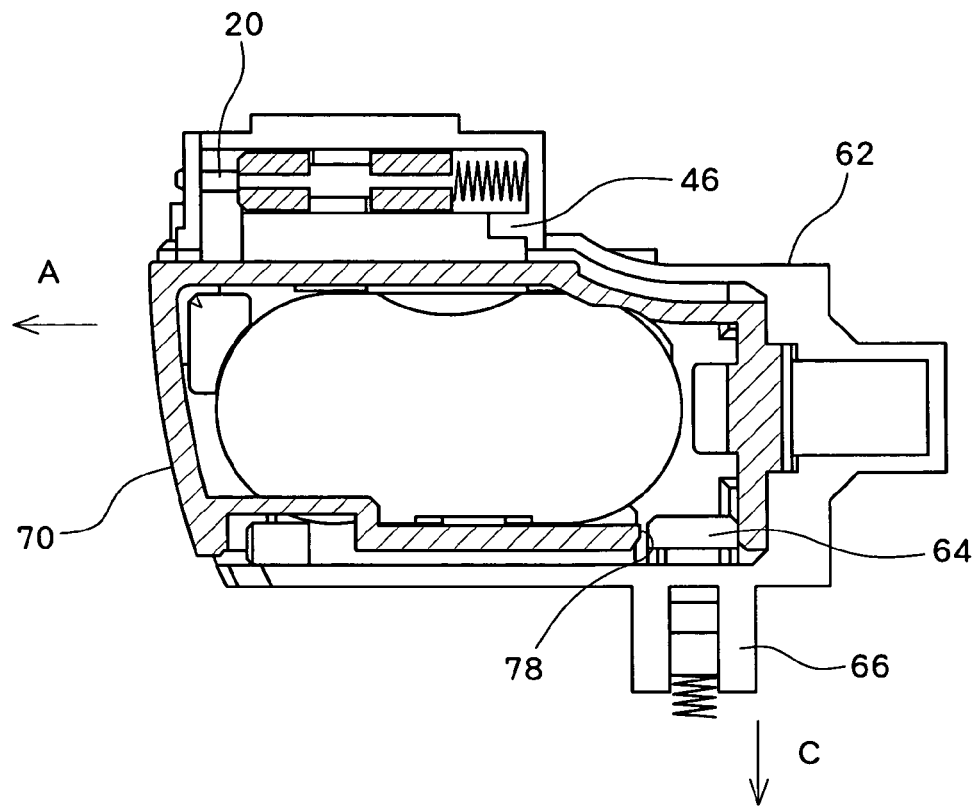
FIG. 11 is a diagram for explaining the opening and closing movement of the lid 70.

FIG. 10 is an exploded perspective view showing the inner surface of the lid 70. On the inner surface of the lid 70 in a lateral position (lateral with respect to the sliding direction) opposing the latch piece 64, a latch receiver 78 is formed. All other features of the battery case lid 70 except for this latch receiver 78 are identical with those of the above-described battery case lid 18. FIG. 11 is a cross-sectional view of the lid 70 as can be seen from the upper side of the battery box 62, showing the relationship between the latch piece 64 and the latch receiver 78. The latch receiver 78 is formed by cutting away a portion of a wall disposed along the edges of the lid 70. The latch piece 64 is inserted into the latch receiver 78 to retain the lid 70 in the closed position.

The opening and closing operation of the lid 70 is generally similar to that performed for the battery case 10, with the exception that, whereas the sliding movement of the lid 18 of the battery case 10 is caused by the pressure of the user's finger on the lid 18 in a sliding manner, the sliding movement of the lid 70 of the battery case 60 is effected by spring force. When opening the lid 70, the user moves the latch piece 64 in the direction of arrow C in FIG. 11 to disengage the latch. As a result, the urging force of the slide spring 76 is released, which works to slide the lid 70 in the direction of arrow A to the hook release position. When placed in the hook release position, the lid 70 is rotated to the open position by the urging force of the rotation spring 40. It should be noted that a spring similar to the slide spring 76 for urging the lid in the sliding direction may be provided in the configuration of the above-described battery case 10, such that, when the retaining spring 35 is disengaged, the lid is slid to the hook release position by spring force and subsequently rotated to the open position by the rotation spring force.

During closing of the lid 70, the stopper 46 functions to prevent jamming of the hooks 28 directly on the hook receivers 30, as in the battery case 10. Immediately before completion of the rotating movement of the lid 70, an underside of a hook (denoted by reference numeral 80 in FIG. 10) abuts the latch 64. A slope 80 is formed in the portion of the latch 64 abutted by the hook underside 80. When the lid 70 is further rotated to complete the rotation, the slope 80 causes the latch 64 to retreat, that is, to move in the direction of arrow C in FIG. 11. As a result, the lid 70 is placed in the hook release position, and subsequently slid into the closed position.

In the battery case 60 as described above, the lid 70 is opened by a simple one-step operation of the latch piece 64, allowing the user to perform the opening operation using only one hand. While the sliding and rotating movements are executed separately by the slide spring 76 and the rotation spring 40 in the embodiment shown in FIG. 9, a single spring (denoted by reference numeral 77 in FIG. 9) which provides force along both the axial direction and the torsion direction may be provided in the position of the slide spring 76 so as to replace those two springs. In order to provide the torsion force, the spring 77 may be configured as a coil spring having its both ends protruding in the radial direction.

Figure 12:
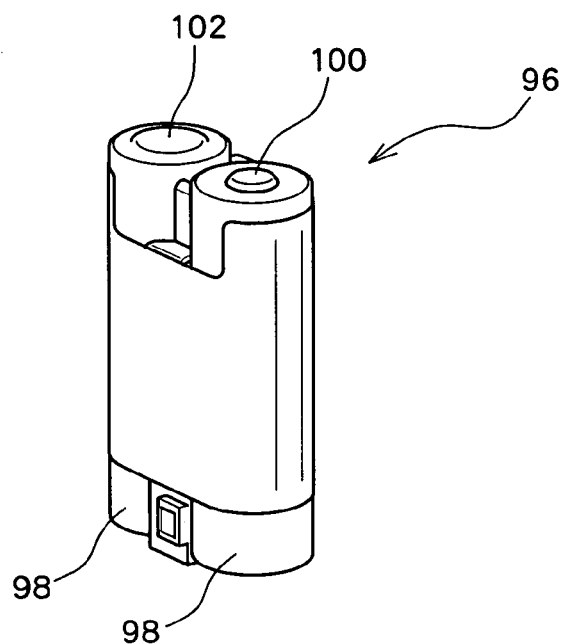
FIG. 12 is an external perspective view of a combined battery set.

As shown in FIG. 10, the contact piece 26 for electrically contacting a terminal of the battery is provided on the inner surface of the battery case lid 70. The contact piece 26 comprises a metal member 90 including a contact for contacting a battery terminal, and caps 92, 94 made of an insulating material for limiting electric contact of the metal member 90 to only a predetermined terminal of the battery. The battery to be placed inside the battery case 60 is a combined battery set 96 as shown in FIG. 12. The combined battery set 96 comprises two cylindrical battery cells which are assembled into a single unit with the opposite poles positioned adjacent to one another. One cell has its positive terminal 100 facing up, while the other cell has its negative terminal 102 facing up. It should be noted that the battery to be placed inside the battery case need not be a combined battery set and may alternatively comprise discrete battery cells 98.

The metal member 90 includes a base portion 104 in the center and arms 106, 108 protruding toward the right and the left from the base portion 104. The metal member 90 is generally arch-shaped with the base portion 104 defining the top portion of the arch. Provided in the center of the arm 106 is a positive terminal contact 110 for contacting the positive terminal 100 of the combined battery set 96. The peripheral portion of the arm 106 is surrounded by the cap 92. The edges of the cap 92 are formed thick so as to extend beyond the apex of the positive terminal contact 110, such that, even when the flat negative terminal 102 of the combined battery set is placed opposing the positive terminal contact 110, the negative terminal and the contact remain apart by a predetermined distance. Because the positive terminal 100 is formed protruding from the end surface having the diameter of the battery cylinder, the positive terminal 100 can contact the positive terminal contact 110 without being blocked by the cap 92. The other arm 108 includes, in positions away from its center, two negative terminal contacts 112. The negative terminal contacts 112 are formed by bending down (toward the front in FIG. 10) portions of the metal plate which constitutes the metal member 90. The negative terminal contacts 112 fit through the slits formed in the cap 94, and slightly protrude out of the surface of the cap 94. When the negative terminal 102 is placed opposing the arm 108, the negative terminal 102 can contact the negative terminal contacts 112 because of its large area. However, when the positive terminal 100 having a smaller area is placed opposing the arm 108, the positive terminal 100 is simply positioned between the two negative terminal contacts 112 without contacting them. Furthermore, because an oval or elliptical recess 116 is formed in the central portion of the cap 94, the positive terminal 100 will fit inside this recess 116. This structure prevents the positive terminal 100 from slipping laterally to inadvertently contact the negative terminal contacts 112.

As shown in FIG. 10, a supporting boss 118 and detent protrusions 120, 122 are formed on the inner surface of the battery case lid 70. The supporting boss 118 and the two detent protrusions 120, 122 protrude out of the supporting surface 124 provided on the inner surface of the lid 70. The detent protrusions 120, 122 are configured such that one protrusion 120 has a rectangular cross-section while the other protrusion 122 has a circular cross-section. In the base portion 104 of the contact piece 26, a supporting hole 126 is formed in a position corresponding to the supporting boss 118, and detent holes 128, 130 are created corresponding to the detent protrusions 120, 122. Corresponding to the respective protrusions 120, 122, the two detent holes are shaped such that the hole 128 is rectangular while the other hole 130 is circular. This configuration prevents mounting of the contact piece 26 in the incorrect orientation. Further, the supporting boss 118 and the detent protrusions 120, 122 are each provided with a relatively large clearance with respect to the corresponding holes 126, 128, 130. By providing the relatively large differences between the outside diameters and the corresponding inside diameters for these members, slight movement of the contact piece 26 is permitted after the contact piece 26 is attached to the inner surface of the lid 70. The contact piece 26 is placed on the supporting surface 124 of the lid inner surface, and attached to the supporting surface 124 by fixing a support screw 132 in the supporting boss 118.

Figure 13:
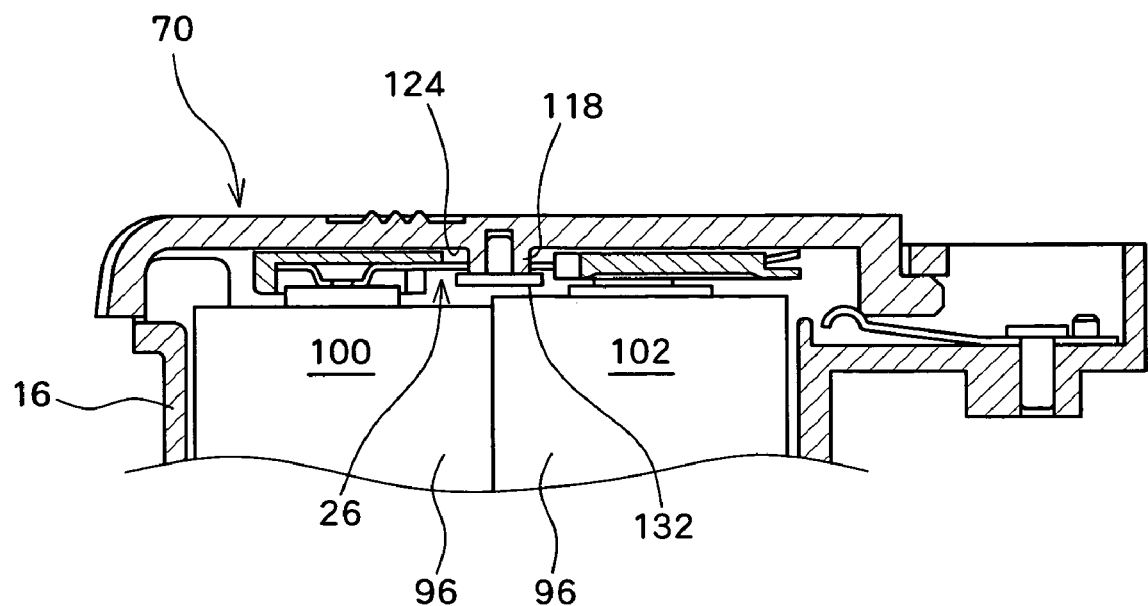
FIG. 13 is a cross-sectional view showing the contact piece 26 in a mounted state.

FIG. 13 is a cross-sectional view showing the contact piece 26 being mounted on the battery case lid 70. As can be seen, the contact piece 26 is supported in the gap between the flange portion of the supporting screw 132 and the supporting surface 124. In other words, the contact piece 26 is mounted with a clearance having the height of the supporting boss 118.

Figure 14:
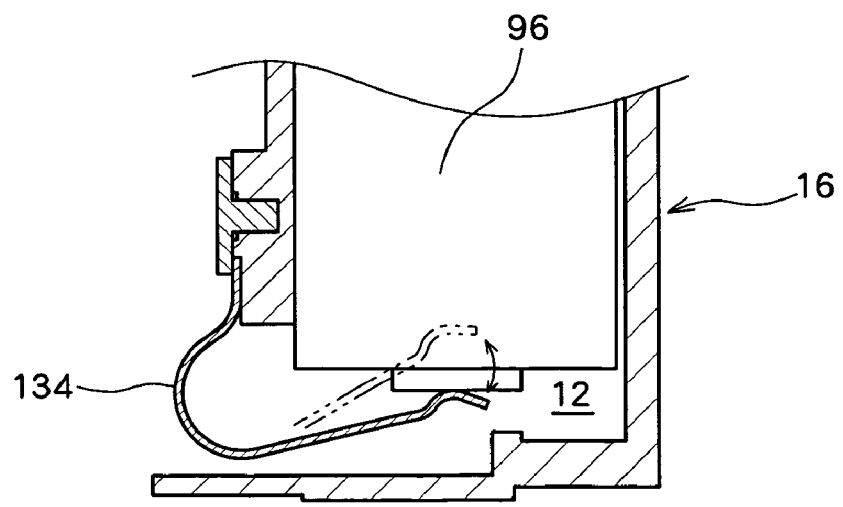
FIG. 14 shows a contact provided at a bottom portion of the battery case.

Because of this clearance and the above-noted differences between the dimensions of the boss and protrusions and the corresponding holes, the contact piece 26 is mounted in a rockable, seesaw-like manner. In the combined battery set 96 comprising two battery cells 98, there may be cases in which the two battery cells 98 are assembled out of alignment with one another along the axial direction, resulting in a difference in the positional height between the positive terminal 110 and the negative terminal 102. If the contact piece 26 is not rockable and the base portion 104 is completely immobile on the lid 70, the left and right arms 106, 108 would be operatively independent from one another. With such an arrangement, when a battery comprising two battery cells 98 assembled out of alignment are placed in the battery case, pressures by which the positive and negative contacts abut the battery cell terminals would likely become unbalanced. In contrast, according to the present embodiment, because the contact piece 26 is rockable, the positional height difference of the battery terminals due to misalignment can be absorbed, balancing the abutting pressures of the contacts. FIG. 14 is a cross-sectional view illustrating the bottom portion of the battery box 16. One end of a contact piece 134 is fixed on the external wall of the battery box 16. The contact piece 134 is curved such that the other end extends into the bottom of the housing chamber 12. When the combined battery set 96 is not placed inside, the contact piece 134 is positioned as shown by dashed lines in FIG. 14. When the combined battery set 96 is inserted, the contact piece 134 is pressed down to the position shown by solid lines in FIG. 14. In this state, a gap is maintained between the combined battery set 96 and the bottom of the battery box 16. When the electronic device receives a shock by being dropped or the like, the combined battery set 96 may move by the distance of this gap. If the abutting pressure of the contact piece 26 on the lid is insufficient, the contact piece 26 may not be able to conform with the movement of the combined battery set 96, resulting in momentary disconnection. Such disconnection would likely occur particularly when the abutting pressure of the positive and negative contacts are unbalanced. According to the present embodiment, because the contact piece 26 is supported with a clearance to permit rocking movement in a rocker-like manner, equal abutting pressures are maintained at the two contacts, thereby avoiding such momentary disconnection.

Figure 15:
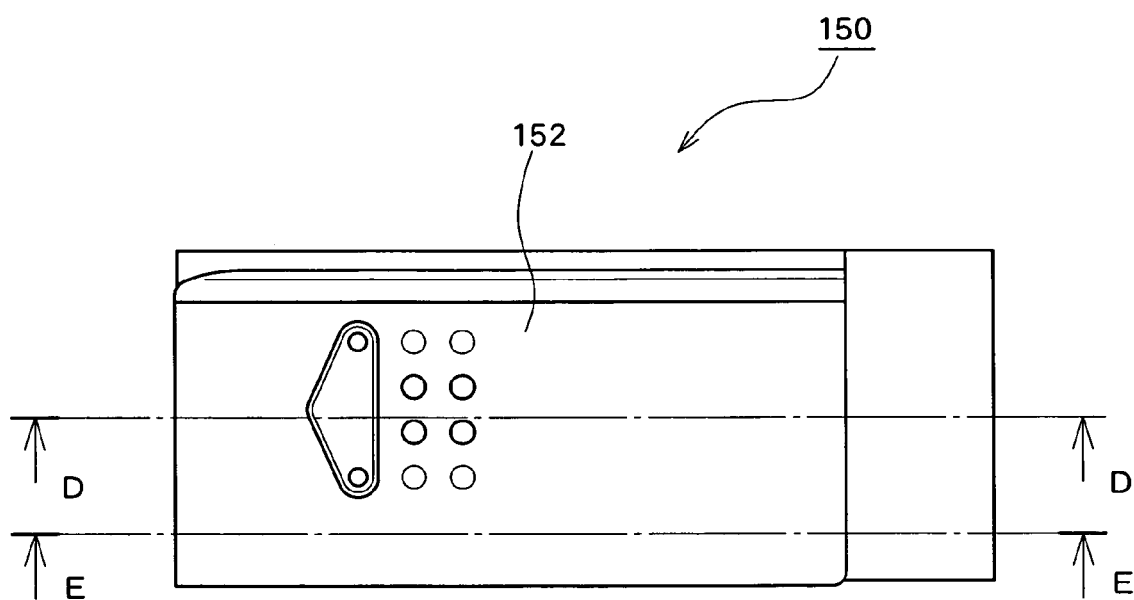
FIG. 15 is a diagram showing the lid and surrounding portions of a battery case according to another embodiment of the present invention.
Figure 16:
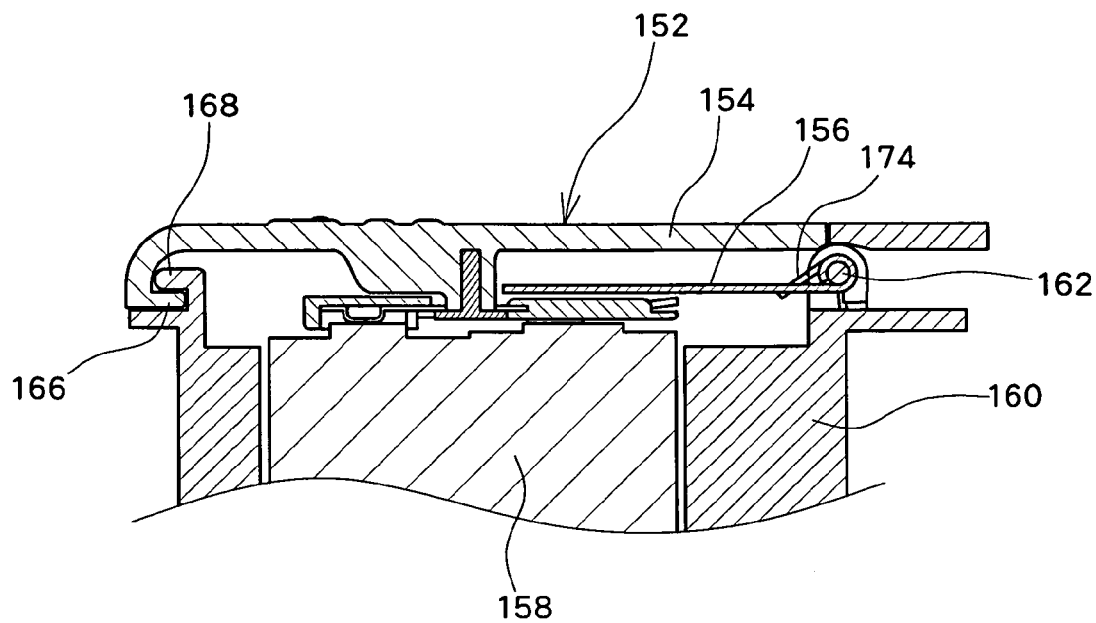
FIG. 16 is a cross-sectional view taken along line D-D in FIG. 15.
Figure 17:
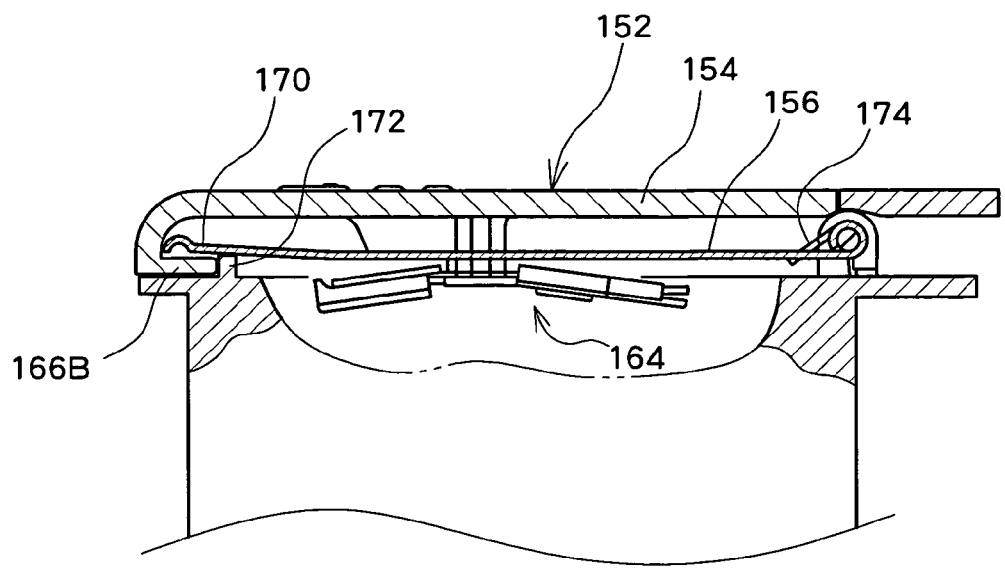
FIG. 17 is a cross-sectional view taken along line E-E in FIG. 15.
Figure 18:
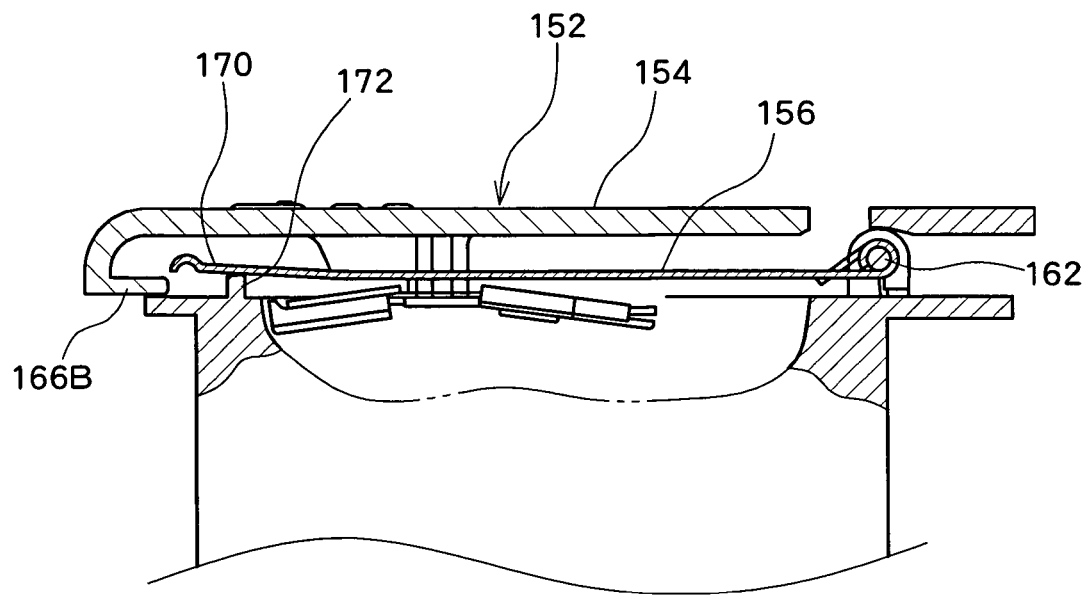
FIG. 18 is a diagram for explaining the opening and closing movement of the lid 152, and specifically illustrate the lid in the hook release position.
Figure 19:
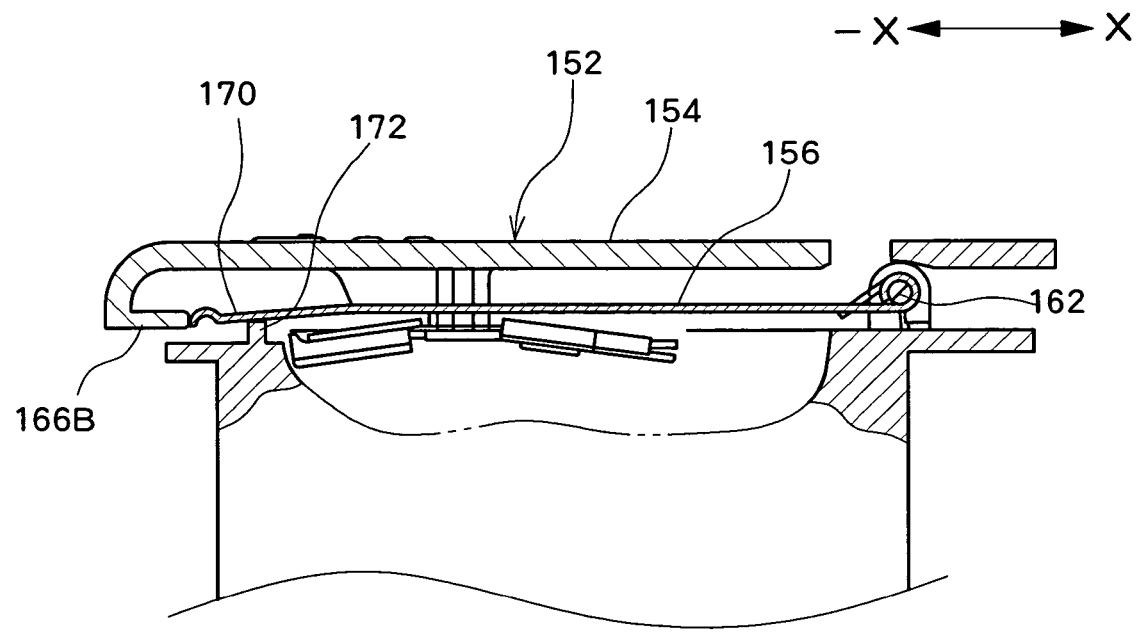
FIG. 19 is a diagram for explaining the opening and closing movement of the lid 152, and specifically illustrate the stopper 170 abutting the lid body 154 so as to prevent sliding of the lid body.
Figure 20:
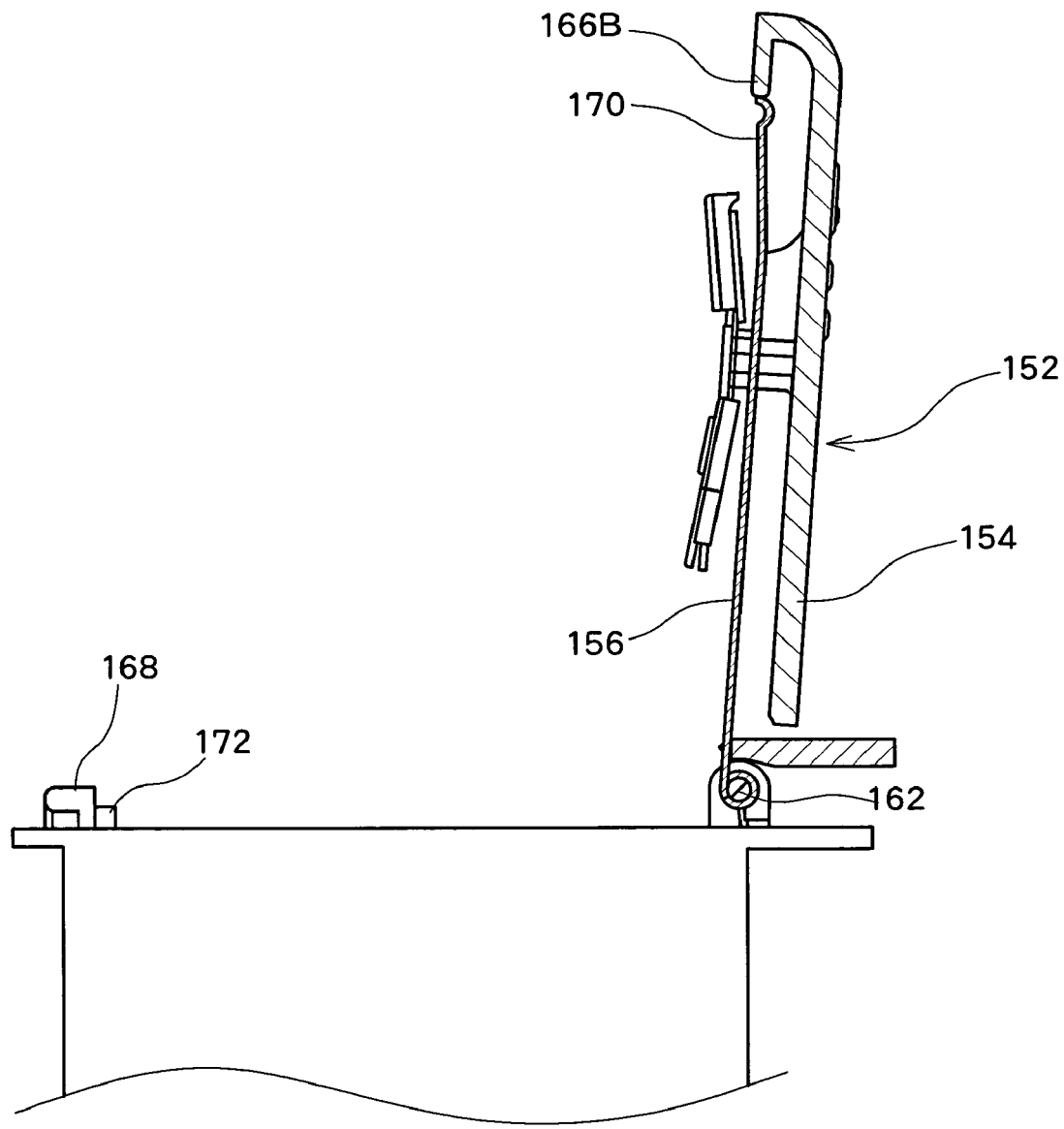
FIG. 20 is a diagram for explaining the opening and closing movement of the lid 152, and specifically illustrate the lid in the opened position.

FIGS. 15-20 are diagrams showing a battery housing structure according to another embodiment of the present invention, which specifically illustrate in detail the structure of the lid and surrounding portions. FIG. 15 is a plan view of the battery case 150 obtained by viewing the case from the direction of insertion of a battery into the case. FIG. 16 is a cross-sectional view taken along line D-D in FIG. 15 with the battery placed inside, while FIG. 17 is a cross-sectional view taken along line E-E in FIG. 15 with the battery removed. FIGS. 18-20 are cross-sectional views taken along line E-E in FIG. 15 during the lid opening and closing movement.

Figure 25:
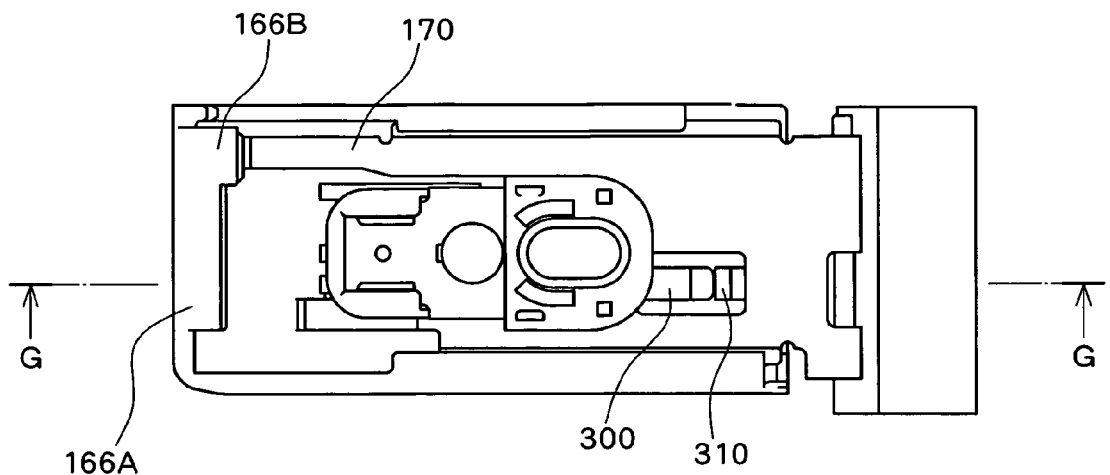
FIG. 25 shows the inside surface of the battery case lid shown in FIG. 15.
Figure 26:
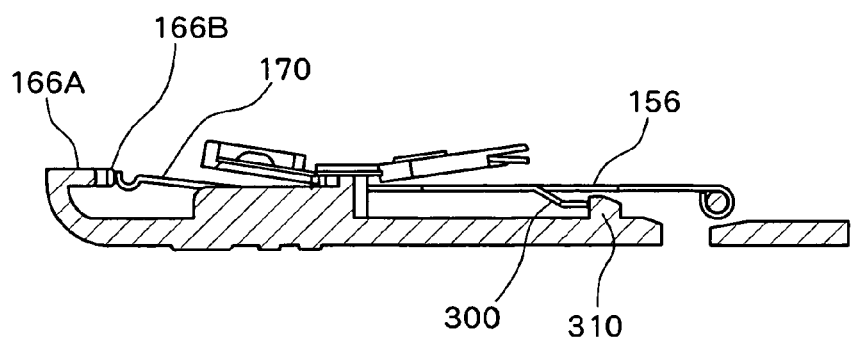
FIG. 26 is a cross-sectional view taken along line G-G in FIG. 25.
Figure 27:
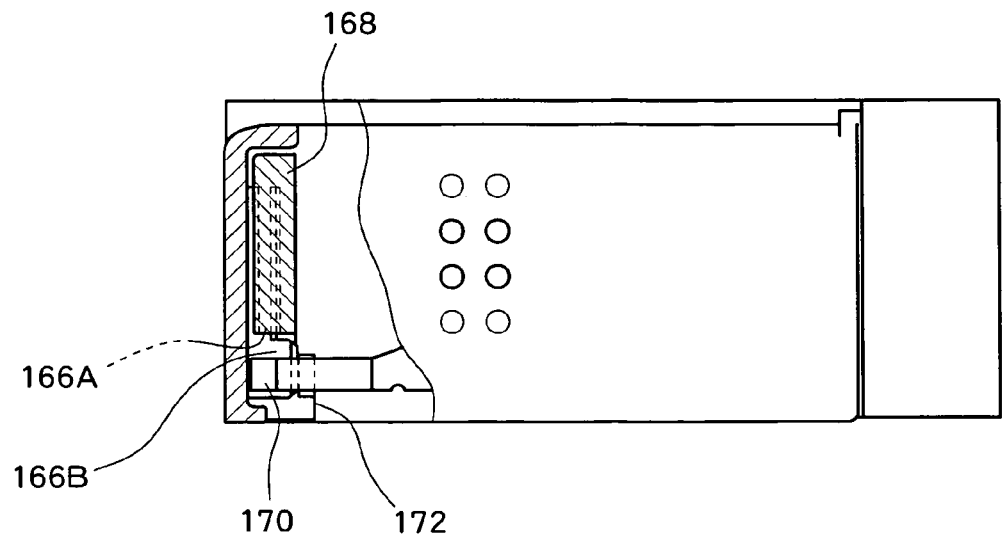
FIG. 27 is a detailed view showing the positional relationship of the hook and hook receiver with respect to the stopper in the battery case of FIG. 15.
Figure 28:
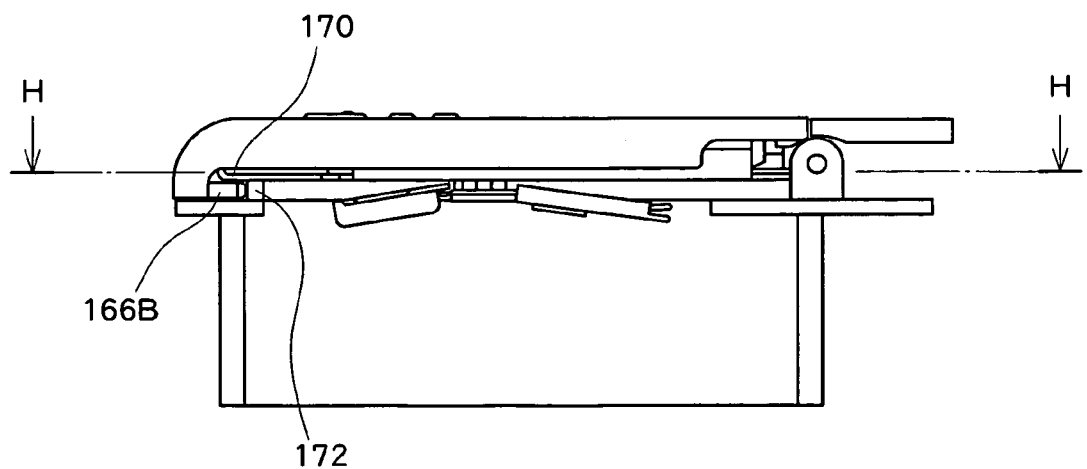
FIG. 28 is a detailed view showing the positional relationship of the hook and hook receiver with respect to the stopper in the battery case of FIG. 15.

In FIGS. 15-17, the battery case lid 152 is in the closed position in which the opening of the battery case 150 is shut. The lid 152 comprises a lid body 154 which covers the opening of the battery case 150, and a lid base 156 which supports the lid body 154 in a manner slidable along the left and right direction in the drawings. The lid base 156 is rotatably supported on a shaft 162 disposed on the battery box 160 for housing the battery 158. A contact piece 164 (refer to FIG. 17) is provided on the inner surface of the battery case lid 152, which is the surface opposing the battery 158. The contact piece 164 has a configuration identical to that of the above-described contact piece 26, and description of the contact piece will not be repeated for this embodiment As shown in FIGS. 16, 25, and 26, at the distal end of the lid 152 opposite from the rotational axis (hereinafter simply referred to as the "distal end"), a hook 166A, 166B is formed integrally with the lid body 152. Further, a hook receiver 168 is formed integrally with the battery box 160 in a position corresponding to the hook 166A. FIG. 26 is a cross-sectional view taken along line G-G in FIG. 25. As shown in FIG. 16, when the lid 152 is in the closed position, the hook 166A and the hook receiver 168 engages with one another so as to prevent rotation of the lid 152, thereby retaining the battery box opening in the covered state. As can be seen in FIGS. 17, 27, and 28, a stopper 170 extends from the lid base 156 toward the distal end. When the lid 152 is in the closed position, the stopper 170 is contacted laterally (that is, laterally with respect to the sliding direction) by a release protrusion 172 formed on an edge of the opening of the battery box 160. In this state, the stopper 170 is positioned displaced from the tip of the hook 166B and overlapping the hook 166B. FIG. 27 is a cross-sectional view taken along line H-H in FIG. 28.

When the lid body 154 is slid toward the left-hand direction in FIG. 17 with respect to the lid base 156, the engagement of the hook 166A with the hook receiver 168 is released. Furthermore, at this point, the stopper 170 and the hook 166A are positioned to not overlap one another (refer to FIG. 18). This state of the lid is referred to as the hook release position. In the hook release position, because the hook and the hook receiver are disengaged, the battery case lid 152 can be rotated. FIG. 19 shows a state in which the lid 152 is slightly rotated from the position shown in FIG. 18. As a result of the rotation, the stopper 170 which was in a deflected state by being pressed laterally by the release protrusion 172 recovers to a neutral state. When the stopper 170 is free from the force applied by the release protrusion 172, the stopper 170 recovers to the neutral state by its resilience. At this point, the tip of the stopper 170 is positioned opposing the tip of the hook 166B on the battery case lid 152. In this state, the stopper 170 prevents the lid body 154 from sliding in the right-hand direction in the drawing (X direction in FIG. 25). More specifically, when an attempt to slide the lid body 154 is made, the tip of the hook 166B abuts the opposing stopper 170 tip to prevent any further sliding. Furthermore, sliding movement in the left-hand direction in the drawing (-X direction in FIG. 25) is prevented by a lid-retaining rib 310 formed on the lid body and a lid-retaining stopper 300 formed on the lid base. The lid 152 is rotated while the stopper 170 abuts the tip of the hook 166, so as to be placed in the open position which allows access to the battery box, as shown in FIG. 20.

During closing of the battery case lid 152, the stopper 170 continues to abut the tip of the hook 166B while in lid positions from the open position to the hook release position, so as to block any movement of the lid body 154 in the X direction. When the release protrusion 172 presses against a lateral portion of the stopper 172 to deflect the stopper 170, the abutment between the stopper 170 and the hook 166B is released. Until this point, the sliding movement of the lid body 154 in the X direction is blocked, such that the hook 166A is prevented from being jammed on top of the hook receiver 168. Only when the stopper 170 is released from abutment with the hook 166B, sliding of the lid body 154 is permitted. By sliding the lid body 154, the hook 166 can be engaged with the hook receiver 168.

A torsion spring 174 may be disposed on the shaft 162 as shown in FIGS. 16 and 17 in order to provide a force for urging the battery case lid 152 toward the open position.

Figure 21:
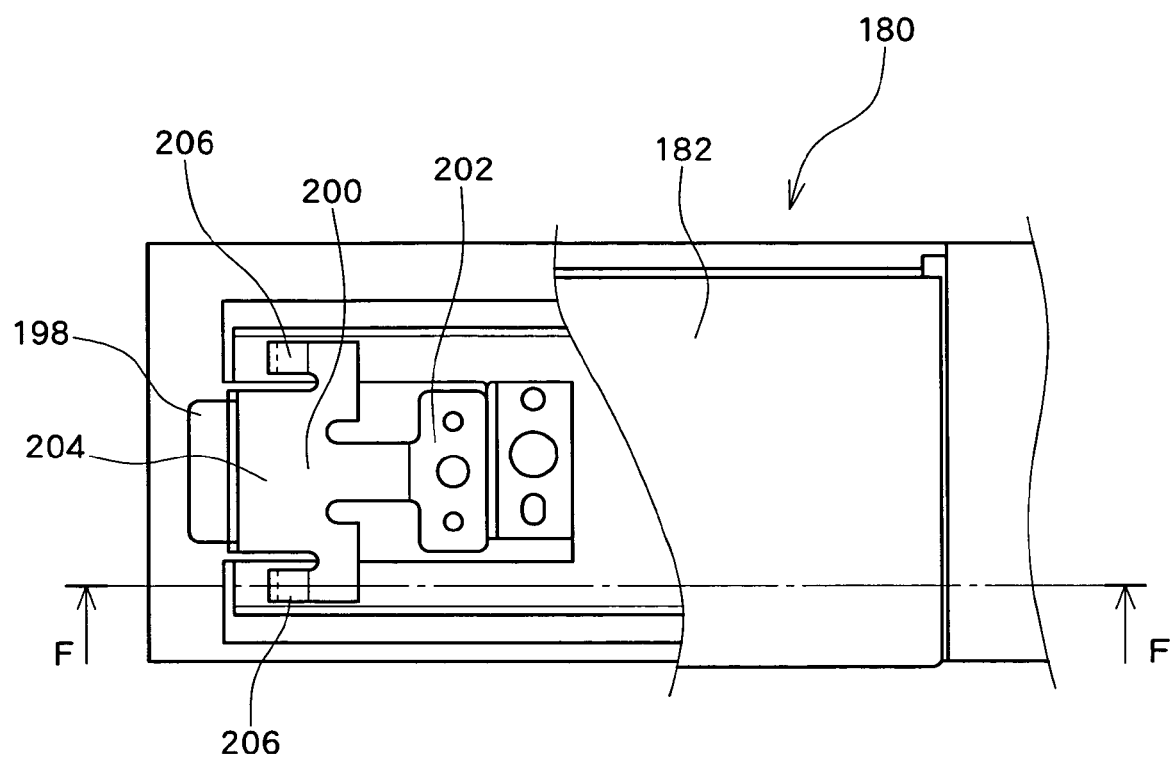
FIG. 21 is a diagram showing the lid and surrounding portions of a battery case according to a further embodiment of the present invention.
Figure 22:
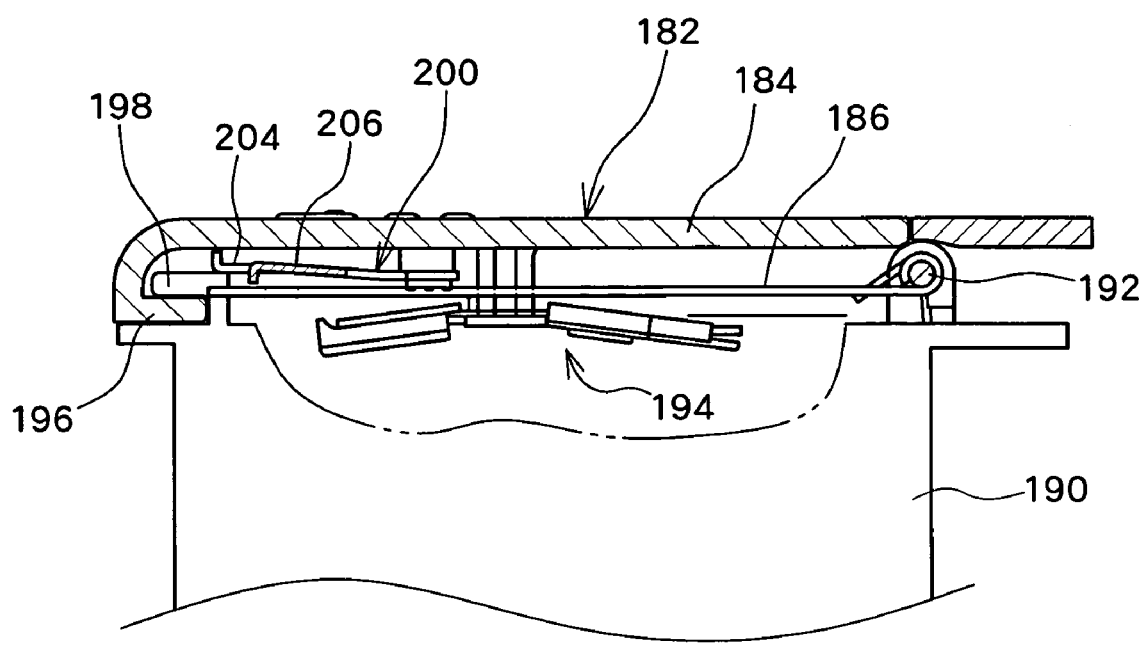
FIG. 22 is a diagram for explaining the opening and closing movement of the lid 182, and specifically illustrate the lid in the closed position.
Figure 23:
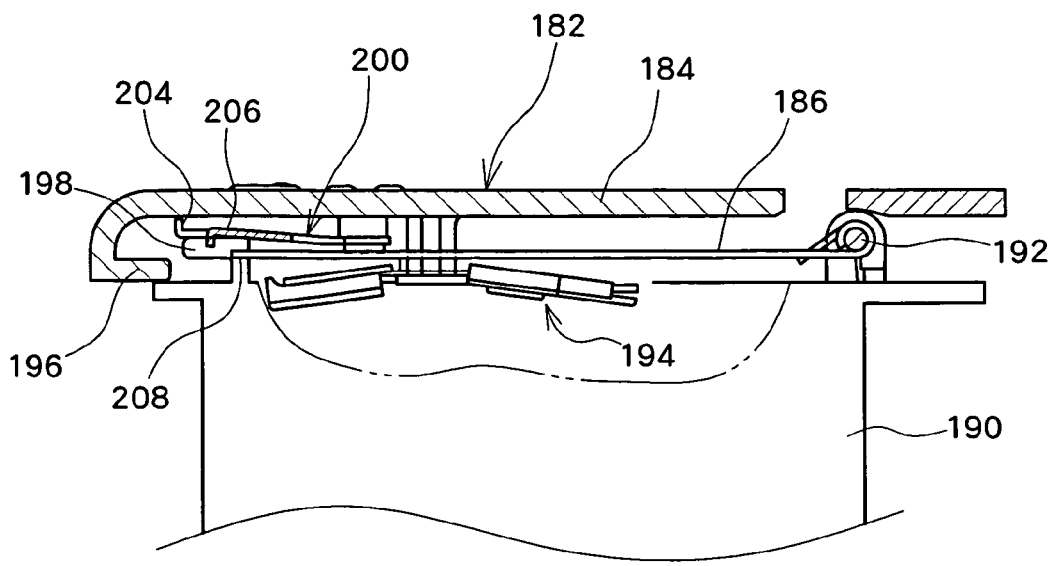
FIG. 23 is a diagram for explaining the opening and closing movement of the lid 182, and specifically illustrate the lid in the hook release position.
Figure 24:
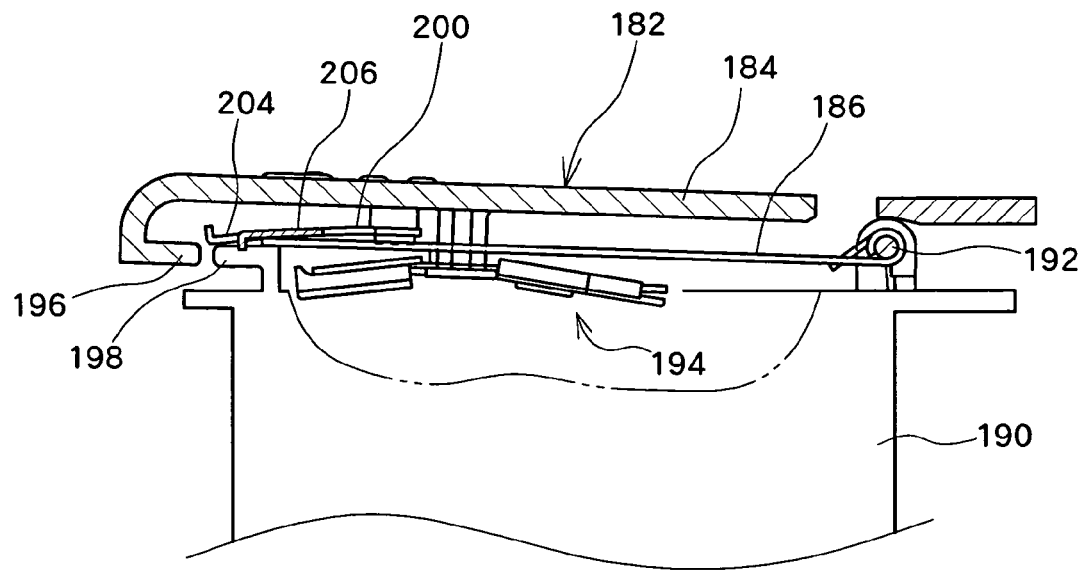
FIG. 24 is a diagram for explaining the opening and closing movement of the lid 182, and specifically illustrate the stopper 200 abutting the lid base 186 so as to prevent sliding of the lid body.

FIGS. 21-24 are diagrams showing a battery housing structure according to a further embodiment of the present invention, which specifically illustrate in detail the structure of the lid and surrounding portions. FIG. 21 is a partly cutaway plan view of the battery case 180 obtained by viewing the case from the direction of insertion of a battery into the case. FIG. 22 is a cross-sectional view taken along line F-F in FIG. 21. FIGS. 23 and 24 are cross-sectional views taken along line F-F in FIG. 21 during the lid opening and closing movement.

In FIGS. 21 and 22, the battery case lid 182 is in the closed position in which the opening of the battery case 180 is shut. The lid 182 comprises a lid body 184 which covers the opening of the battery case 180, and a lid base 186 which supports the lid body 184 in a manner slidable along the left and right direction in the drawings. The lid base 186 is rotatably supported on a shaft 192 disposed on the battery box 180 for housing the battery. A contact piece 194 (refer to FIG. 22) for contacting the battery is provided on the inner surface of the battery case lid 182. The contact piece 194 has a configuration identical to that of the above-described contact piece 26, and description of the contact piece will not be repeated for this embodiment.

As shown in FIG. 22, at the distal end of the lid 182 opposite from the rotational axis (hereinafter simply referred to as the "distal end"), a hook 196 is formed integrally with the lid body 184. Further, a hook receiver 198 is formed integrally with the battery box 190 in a position corresponding to the hook 196. As shown in FIG. 22, when the lid 182 is in the closed position, the hook 196 and the hook receiver 198 engages with one another so as to prevent rotation of the lid 182, thereby retaining the battery box opening in the covered state. A stopper 200 comprising a shaped leaf spring member is fixed on the inner surface of the lid body 184 of the battery case lid in a position toward the distal end. As clearly shown in FIG. 21, the stopper 200 includes a fixed end portion 202 which is fixed on the lid body 184, a stem portion 204 extending from the fixed end portion toward the distal end (left-hand direction in the drawing), and cornered portions 206 protruding sideways from the stem portion and then extending toward the distal end. The tips of the cornered portions 206 are bent downward as shown in FIG. 22 in the shape of L. The stem portion 204 extends over the hook receiver 198.

As noted above, FIG. 22 shows the battery case lid 182 in the closed position. In this state, the tip of the stopper stem 204 abuts the top surface of the hook receiver 196, and the stopper 200 is thereby deflected upward. When the lid body 184 is slid to the left with respect to the lid base 186 to be placed in the position of FIG. 23, the engagement of the hook 196 with the hook receiver 198 is released, thereby permitting the lid 182 to rotate to the open position. This state of the lid 182 shown in FIG. 23 is referred to as the hook release position. FIG. 24 shows a state in which the lid 182 is slightly rotated from the hook release position. In this state, the hook receiver 198 no longer presses against the stopper 200, and the stopper 200 recovers to its neutral position in which the free end of the stopper 200 is located further away from the lid body 184 compared to in the position shown in FIG. 23. When the stopper 200 recovers to its neutral position, the tips of the cornered portions 206 of the stopper engage with the distal end edge 208 of the lid base 186. This engagement blocks sliding movement of the lid body 184 toward the shaft 192. The battery case lid 182 is rotated while in this state to the open position which allows access to the battery box.

During closing of the battery case lid 182, the cornered portions 206 of the stopper 200 continue to engage with the distal end edge of the lid base 208 while in lid positions from the open position to the hook release position, so as to block sliding movement of the lid body 184. As a result, jamming of the hook 196 on top of the hook receiver 198 is prevented. Immediately before the lid 182 reaches the hook release position, the hook receiver 198 contacts the stopper stem 204 to deflect the stopper 200, thereby disengaging the cornered portion 206 of the stopper 200 from the lid base 186. In this manner, the hook receiver 198 functions as a release protrusion for releasing engagement between the stopper and the lid base. When this engagement is released, the lid body 184 is permitted to slide to the closed position. Further, a torsion spring 210 similar to the above-described torsion spring 174 may be employed to urge the battery case lid 182 toward the open position.

What is claimed is:

1. A battery housing structure for an electronic device, comprising:
    a battery box for housing a battery, having an opening on one end so as to allow insertion and removal of the battery; and
    a battery housing lid which removably covers the opening; wherein
    the lid includes a hook which engages with a hook receiver disposed on the battery box while the lid is in a closed position;
    the lid is supported on a shaft which is mounted on the battery box, in a manner such that the lid can rotate using the shaft as an axis and is also slidable along an axial direction of the shaft;
    the lid slides from the closed position so as to disengage the hook and the hook receiver, thereby moving to a hook release position where rotation of the lid is permitted, and subsequently the lid rotates from the hook release position to an open position so as to uncover the opening of the battery box; and
    a slide prevention mechanism is provided on the lid and the battery box, the slide prevention mechanism permitting sliding of the lid to the closed position when the lid is in the hook release position and blocking movement in the sliding direction when the lid is in a position between the hook release position and the open position.

2. A battery housing structure as defined in claim 1, wherein
    the slide prevention mechanism comprises:
    a support arm provided on the lid, for attaching a cover portion of the lid which covers the opening of the battery box to the shaft in a manner extending from the shaft; and
    a stopper provided on the battery box, which abuts a side surface of the support arm when the lid is in a position between the hook release position and the open position; wherein
    when the lid is in the hook release position, the stopper is released from abutment with the support arm and the lid is permitted to slide to the closed position.

3. A battery housing structure as defined in claim 2, wherein
    the support arm is substantially J-shaped; and
    when the lid is in the hook release position, the stopper is released from abutment with the support arm by being positioned in an inside section of the substantial J shape of the support arm.

4. A battery housing structure as defined in claim 1, further comprising:
    a latch for preventing sliding of the lid from the closed position;
    a first spring for urging the lid from the hook release position to the open position; and a second spring for urging the lid from the closed position to the hook release position; wherein when the latch is released, the lid is slid by the second spring to the hook release position and subsequently rotated by the first spring from the hook release position to the open position.

5. A battery housing structure as defined in claim 1, further comprising:

a latch for preventing sliding of the lid from the closed position; and a single spring for urging the lid from the hook release position to the open position and from the closed position to the hook release position; wherein when the latch is released, the lid is slid to the hook release position and subsequently rotated to the open position by the spring.

6. A battery housing structure as defined in claim 1, further comprising:

a contact piece disposed on an inside surface of the lid, for contacting with a contact portion of the battery; wherein the contact piece and the contact portion of the battery are scraped against one another during opening and closing operations of the battery housing lid, such that an oxide film formed on surfaces of the contact piece and the contact portion are scraped off.

* * * * *